(12) United States Patent
Tabirian et al.

(10) Patent No.: US 7,352,790 B2
(45) Date of Patent: Apr. 1, 2008

(54) METHOD AND APPARATUS FOR PRODUCING AN EYE-SAFE LASER

(75) Inventors: Anna M. Tabirian, Winter Park, FL (US); Douglas P. Stanley, Longwood, FL (US); Steve Guch, Jr., Mount Dora, FL (US); Ronald R. Selleck, Orlando, FL (US); Lloyd H. Morton, Winter Park, FL (US)

(73) Assignee: Northrop Grumman Corporation, Los Angeles, CA (US)

( * ) Notice: Subject to any disclaimer, the term of this patent is extended or adjusted under 35 U.S.C. 154(b) by 104 days.

(21) Appl. No.: 11/337,757

(22) Filed: Jan. 23, 2006

(65) Prior Publication Data

US 2006/0165134 A1 Jul. 27, 2006

Related U.S. Application Data

(60) Provisional application No. 60/645,771, filed on Jan. 21, 2005.

(51) Int. Cl.
*H01S 3/091* (2006.01)

(52) U.S. Cl. .............................. 372/70; 372/72; 372/6

(58) Field of Classification Search ................. 372/70, 372/72
See application file for complete search history.

(56) References Cited

U.S. PATENT DOCUMENTS 6,269,108 B1 7/2001 Tabirian et al.
6,567,431 B2 5/2003 Tabirian et al.
2002/0031151 A1* 3/2002 Tabirian et al. ............... 372/39

OTHER PUBLICATIONS

Tabirian (New efficient , Room Temperature Mid-Infrared Laser to 3.9 MU M Holmium-Barium Yttrium Fluoride and Visible Praseodymium: Lithiumuyttrium Fluoride, Year 2000).*
R.C. Stoneman, L. Esterowitz; Continuous-Wave 1.50-U, Thulium Cascade Laser; Received Sep. 21, 1990; Accepted Nov. 30, 1990; Naval Research laboratory, Washington, DC.
Kenneth Michael Dinndorf; Energy Transfer Between Thulium And Holmium In Laser Hosts; Department of Physics in Partial Fulfillment of the Requirements for the Degree of Doctor of Philosophy; Sep. 1993; Massachusetts Institute of Technology.
L. Wetenkamp; Efficient Cw Operation Of A 2.9 Um $Ho^{3+}$ -Doped Fluorizircontate Fibre Laser Pumped At 640 Nm; Electron Letters; 1990; vol. 26.

(Continued)

*Primary Examiner*—Dung (Michael) T. Nguyen
(74) *Attorney, Agent, or Firm*—Alston & Bird LLP

(57) ABSTRACT

A lasing apparatus includes a laser medium and a pump source. The laser medium includes one of a Holmium-doped fluoride crystal or a Holmium-doped fluorozirconate ZBLAN glass fiber. The pump source generates pulses that resonantly pump the laser medium such that the laser medium produces an output from the $^5I_5$ level to the $^5I_7$ level of Holmium. The pump source produces pulses having a duration that is at least as long as a storage time of the $^5I_5$ level of the laser medium. The pump source pumps the laser medium with signals having a wavelength shorter than 1.67 μm, with the laser medium producing an output having a wavelength of about 1.67 μm.

17 Claims, 14 Drawing Sheets

OTHER PUBLICATIONS

Anna Murazian Tabirian; New Efficient, Room Temperature Mid-Infrared Laser To 3.9 MU M Holmium-Barium Yttrium Fluoride And Visible Praseodymium:Lithiumuyttrium Fluoride; PhD Dissertation: Physics Department/School of Optics, UCF; 2000.

L. Esterowitz, R.C. Eckard, R.E. Allen; Long-Wavelength Stimulated Emission Via Cascade Laser Action In Ho:YLF; Application Physics Letter; Received Apr. 12, 1979; Accepted for publication May 23, 1979; Naval Research Laboratory, Washington, DC.

A.M. Tabirian, S.C. Butchter, H.P. Jenssen, A. Cassanho, H.J. Hoffman; Efficient, Room Temperature Cascade Laser Action At 1.4 µm And 3.9 µm In Ho:BaY$_2$F$_8$; CLEO 99; 1990; Technical Digest.

A.M. Tabirian, H.P. Jenssen, A. Cassanho; Efficient, Room Temperature Mid-Infrared Laser at 3.9 um in Ho:BaY$_2$F$_8$; Tends in Optics and Photonics Series (TOPS); 2001; pp. 170-176; vol. 50; School of Optics, University of Central Florida, Apopka, Florida.

A.M. Tabirian, H.P. Jenssen, A. Cassanho; Mid-Infrared Room Temperature Ho:BaY$_2$F$_8$; Laser at 3.9 µm;Solid State and Diode Laser Technology Review (SSDLTR); Technical Digest; 2001.

T. Sumiyoshi, H. Sekita; Dual-Wavelength Continuous-Wave Cascade Oscillation at 3 and 2 µm With A Holmium-Doped Fluoride-Glass Fiber Laser; Optics Letters, 1998; vol. 23.

M. Sheik-Bahae, A.A. Said, T.-H. Wei, D.J. Hagan, E.W. Van Stryland; Sensitive Measurement Of Optical Nonlinearity Using A Single Beam; IEEE Journal of Quantum Electronics, Apr. 1990; vol. 26, Issue 4.

\* cited by examiner

FIG. 9a
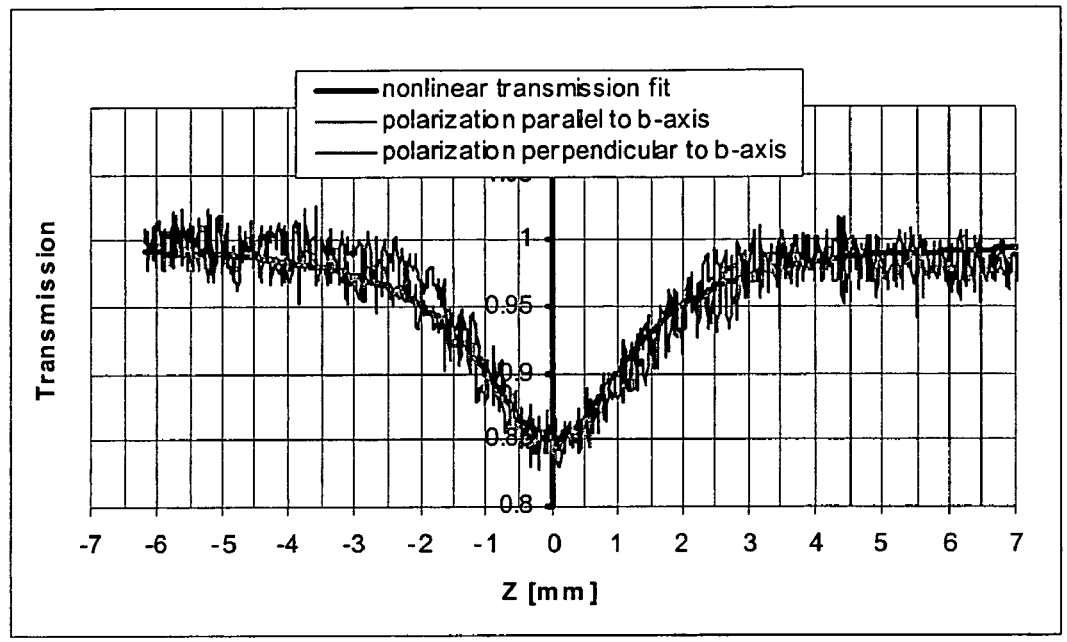
FIG. 9b
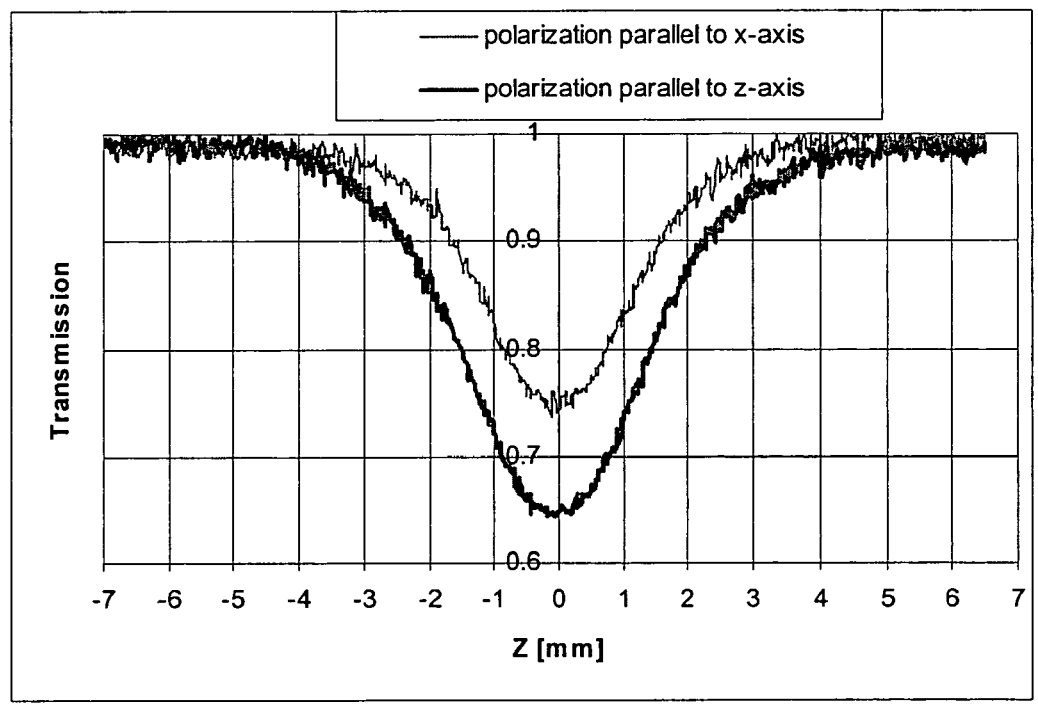

FIG. 10a
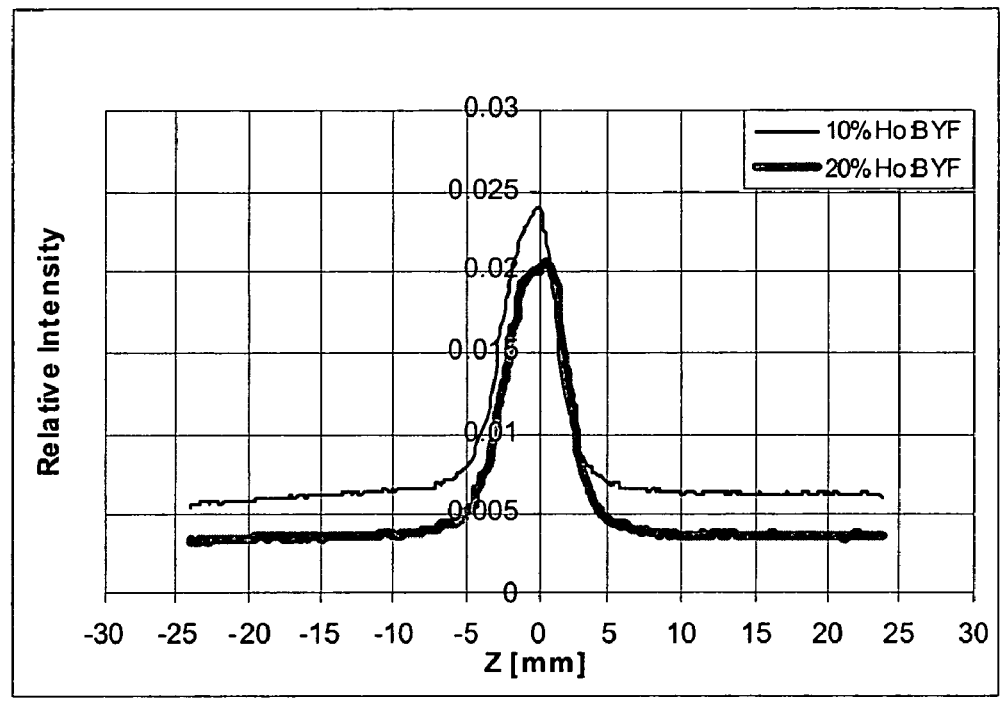
FIG. 10b
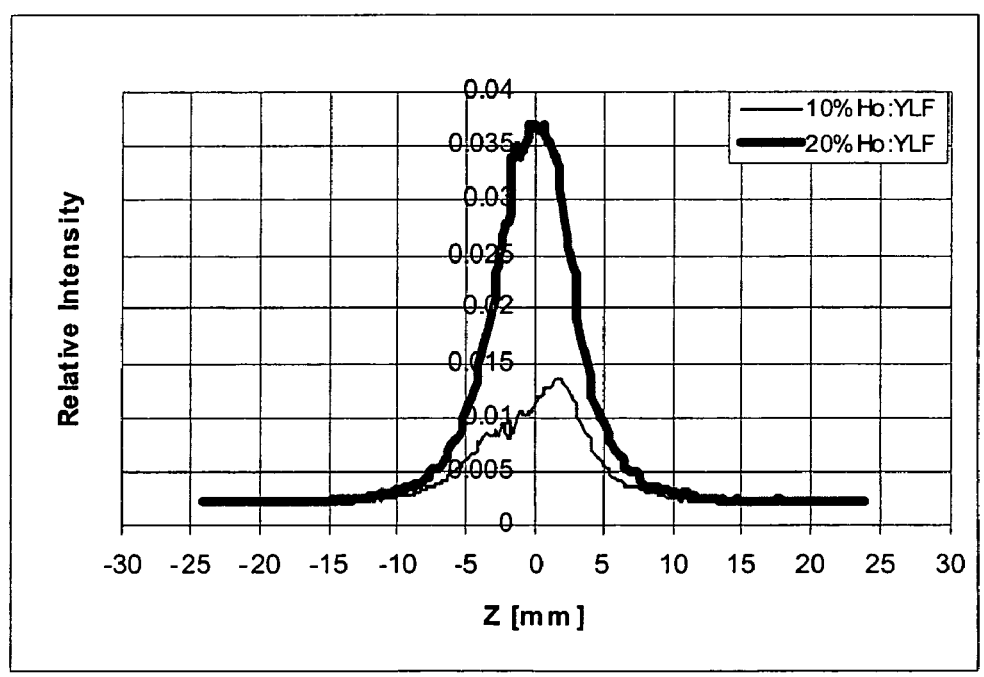

FIG. 11a
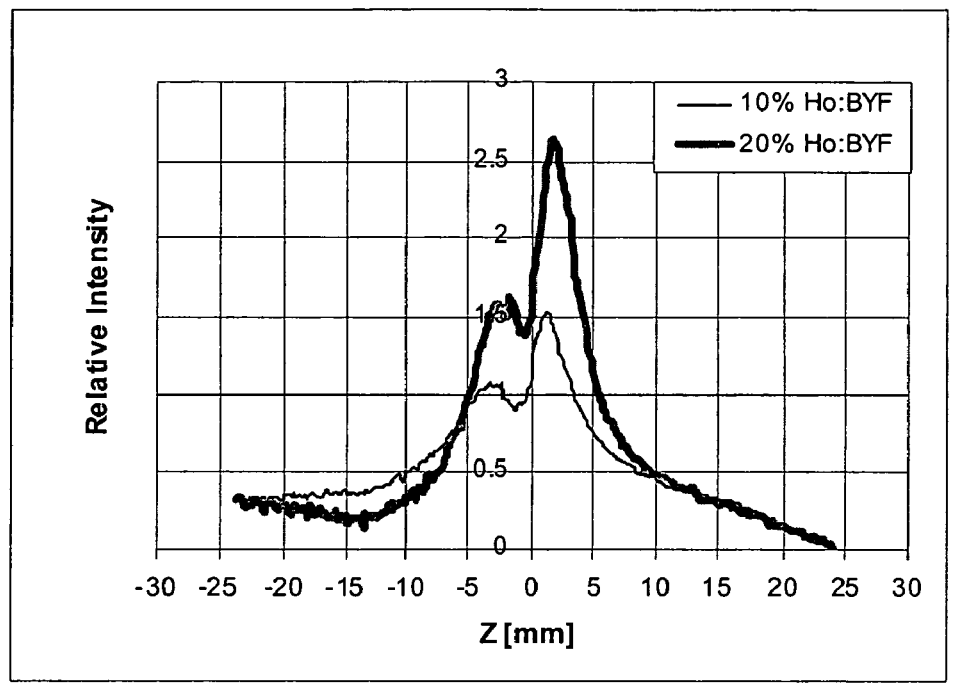
FIG. 11b
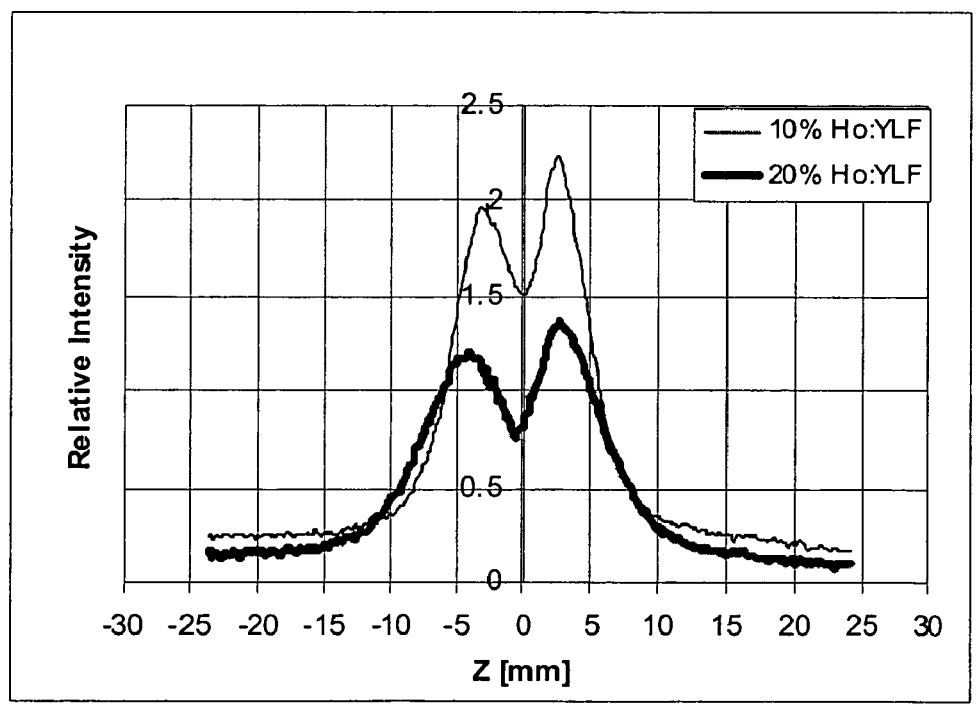

FIG. 12
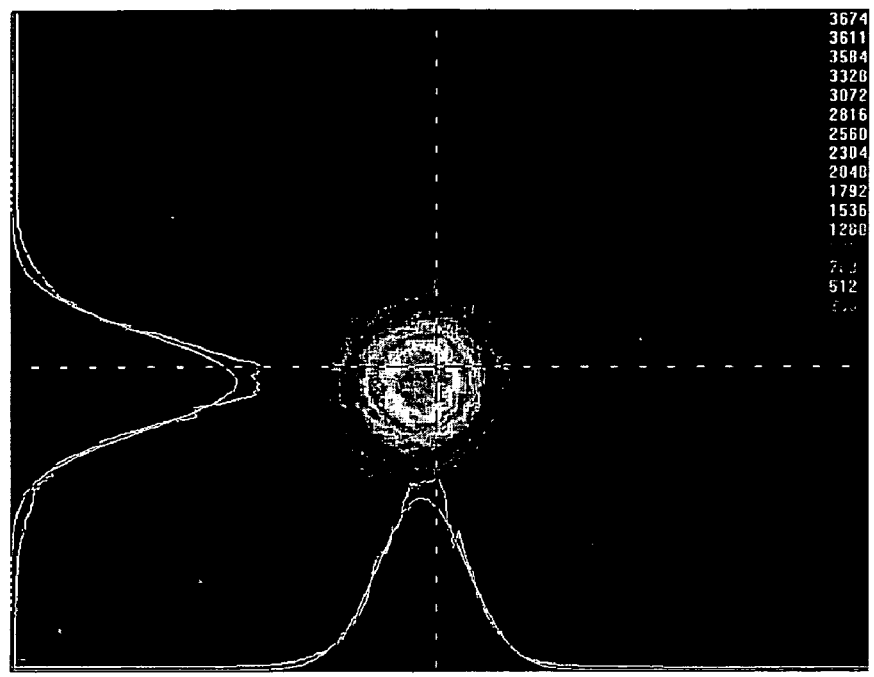
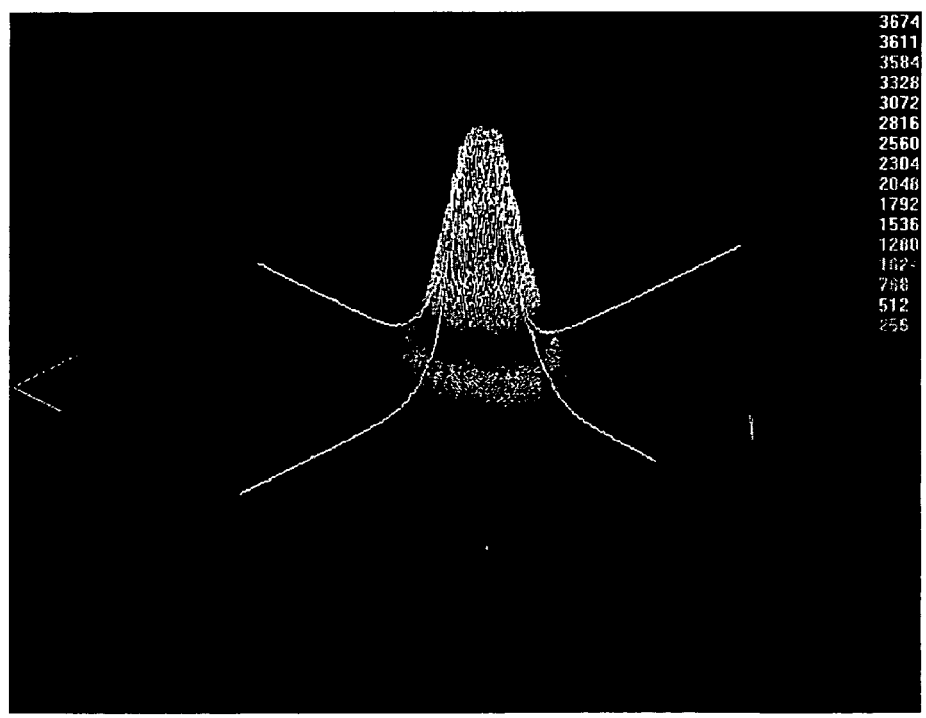

METHOD AND APPARATUS FOR PRODUCING AN EYE-SAFE LASER

CROSS-REFERENCE TO RELATED APPLICATIONS

This application claims the benefit of U.S. Provisional Application No. 60/645,771, filed Jan. 21, 2005, the contents of which are incorporated herein in their entirety.

FIELD OF THE INVENTION

The present invention relates in general to solid-state lasers and more particularly, to a method and apparatus for producing eye-safe laser radiation at room temperature by utilizing resonant pumping and linear down conversion in Holmium doped fluoride crystals.

BACKGROUND AND PRIOR ART

Solid-state lasers operating in the 1.4 μm to 1.8 μm eye-safe wavelength range, which falls into the infrared atmospheric transmission window, have recently been the subject of intense research and development efforts. Applications of such lasers include range finding, illumination for long range target identification using gated imaging, eye-safe 3-D imaging LADAR (laser detection and ranging), remote sensing, etc.

In recent years, the main options considered for lasers in the eye-safe wavelength range were directed at down shifting a shorter wavelength radiation using a nonlinear conversion process such as an optical parametric oscillator (OPO) or Raman conversion. The OPO and Raman conversion methods suffer from a number of drawbacks including optical system complexity and degraded reliability due to, for example, potential damage to a nonlinear crystal used for the OPO or beam quality degradation in the case of Raman conversion. Furthermore, both methods generally require a high peak power (i.e., short pulse) pump laser for efficient radiation conversion. Consequently, both methods do not lend themselves well to quasi-continuous wave (CW) or long pulse applications. Another alternative method for obtaining laser radiation in the eye-safe wavelength range is direct emission from semiconductor lasers, the main drawback of which is a poor beam quality. Flashlamp pumped Erbium (Er),Ytterbium (Yb)-doped glass lasers are frequently used for producing eye-safe laser radiation, but the efficiency of such lasers is normally low (especially in a Q-switched regime due to cross-relaxation mechanisms, which limit stored energies).

It is generally accepted, that an efficient source based on a resonantly pumped in-band solid state laser is a preferred technology path. Resonant pumping of rare-earth-doped solid state lasers using appropriate pump lasers known in the art as linear down-conversion is a viable way of obtaining high-efficiency, multiple-wavelength, high average power sources. Spectral diversity in laser materials may be greatly extended through laser pumping that "shifts" the laser energy downward. Resonant pumping leads to high conversion efficiencies by permitting access to energy states difficult or impossible to pump with incoherent sources. Therefore, neither long lifetimes nor broadband absorption are required. Additionally, radiative upper and lower laser levels result in very low heat loading thereby allowing high average power operation.

The Erbium $^4I_{13/2}$-$^4I_{15/2}$ laser transition has been a popular choice in numerous different hosts for generating laser radiation in the eye-safe wavelength range. In this transition the lower laser level is in the same energy manifold as the ground level, which leads to a three-level laser configuration at room temperature with high thresholds and low efficiency operation. An Erbium ion in a variety of hosts has also lased on the $^4S_{3/2}$-$^4I_{15/2}$ laser transition around 1.73 μm, which behaves more nearly as a four-level transition that can be operated at room temperature. Resonant pumping of the upper laser level $^4S_{3/2}$, however, requires a green pump laser, which leads to a rather low quantum defect for conversion to 1.73 μm. An alternative to $Er^{3+}$ lasers includes lasers based on $^3H_4$-$^3F_4$ laser transition in Thulium (Tm) around 1.5 μm, which are normally self-terminating due to an unfavorable lifetime ratio. However, such a laser action has been successfully demonstrated in the CW regime by quenching the long lived lower laser level through energy transfer to a Holmium $^5I_7$ state and cascade lasing of the $^5I_7$-$^5I_8$ transition at 2.06 μm in Tm, Ho:YLF (Thulium, Holmium: Yttrium Lithium Fluoride). See R. C. Stoneman and L. Esterowitz, "Continuous—wave 1.50-μm thulium cascade laser", Optics Letters, Vol. 16, No 4, (1991).

It is well known that Holmium trivalent ions ($Ho^{3+}$) are capable of producing stimulated emission at several wavelengths across the infrared spectrum. Laser emission from $Ho^{3+}$ is normally associated with the $^5I_7$-$^5I_8$ transition. Apart from this customary transition at 2.06 μm, other higher level transitions in Holmium can be very difficult to lase using standard excitation techniques such as flashlamps, which, being broad-band, require upper laser levels with long fluorescent lifetimes and a small non-radiative decay rate. Yet, some of the most interesting laser transitions, such as the transition at 1.67 μm, originate on levels characterized by lifetimes that are short compared with those of the lower levels. This effectively turns the transition into a three level laser system, resulting in self-terminating laser action. The 1.67 μm transition in Holmium occurs between the $^5I_5$ and $^5I_7$ levels or manifolds. The long lifetime of the lower level $^5I_7$ (17 ms in Barium Yttrium Fluoride (BYF) and 14 ms in YLF) compared to that of the upper laser level $^5I_5$ (50 μs in BYF and 20 μs in YLF), combined with the rapid nonradiative decay rates between the $^5I_5$ and closely spaced $^5I_6$ manifolds, in general produces conditions unfavorable for lasing. See K. M. Dinndorf, "Energy transfer between thulium and holmium in laser hosts," Ph.D. Dissertation, MIT, (1993).

One solution for achieving laser action as a result of the $^5I_5 \rightarrow ^5I_7$ transition under such conditions without cooling is through use of linear down-conversion with pulsed resonant pumping, whereby the upper laser level is directly excited by a narrow band source with a frequency tuned to match an absorption line that is dynamically connected to the upper level of the desired transition. With direct excitation to the upper laser level, a population inversion can be created even from levels where long fluorescence lifetimes are not available, thus circumventing the limitation suffered by broadband excitation techniques. Furthermore, in certain conditions, advantage can be taken of cascaded processes whereby laser oscillation between intermediate levels is exploited for increasing a rate of transition to the upper level of a lower lying manifold, thus achieving inversion on the next, otherwise unfavorable laser transition. This removes the requirement for the long fluorescent lifetime and a small nonradiative decay rate that is otherwise imposed upon the upper laser level since population can be transferred to the desired level through the cascade laser process, with resultant multiwavelength sequential emission. As described below, stimulated emission at 1.67 μm was previously achieved in Ho:YLF, but under such conditions that severely limit prospects of further energy and power scaling to levels needed for the applications mentioned above.

The possibility of obtaining laser emission from a solid state laser doped with $Ho^{3+}$ at 1.67 μm depends to a great extent on which host material is chosen. An important requirement for efficient conversion is that the fluorescence lifetime of the intermediate states and, primarily of the upper laser level should be long. Since the lifetimes of these states are often governed largely by nonradiative decay to lower lying states, it is necessary that the optical phonon energies of the host material be relatively small and/or orbital coupling of an ion to a lattice be relatively weak. These are also characteristics, which will permit fluorescence and stimulated emission to occur at longer wavelengths in the infrared spectrum. Therefore, fluorides, $BaY_2F_8$ (BYF) and $LiYF_4$ (YLF) may be selected as laser host materials, where these conditions are satisfied. Other materials of interest are $Ho^{3+}$ doped fluorozirconate ZBLAN glass, $Ho:NaYF_4$ (Ho:NYF) and $Ho:KY_3F_{10}$ (Ho:KYF). An ability to sustain laser oscillation between two given levels is enhanced in fluorides over oxides in many cases because multiphonon decay rates in fluorides are generally lower. A reduction in upper state multiphonon decay rate generally means a larger product of upper state lifetime with stimulated emission cross-section, and therefore a lower threshold.

The long lifetime of the $^5I_7$ energy manifold for most fluoride materials limits the repetition rate of transitions terminating on that level. There are several methods known from the prior art for efficient depletion of the long-lived lower laser level $^5I_7$, which could lead to a substantial reduction of the effective lifetime of that level. One such approach is described in the U.S. Pat. No. 5,070,507 to Douglas W. Anthon, in which the lifetime of the lower laser level $^5I_7$ of $Ho^{3+}$ in $BaY_2F_8$ (BYF) is selectively quenched by addition of a small amount of such co-dopants as Praseodymium ($Pr^{3+}$) and Europium ($Eu^{3+}$). Anthon describes laser gain materials based on garnets such as Yttrium-Aluminum-Garnet (YAG), Gadolinium-Gallium-Garnet (GGG), and Yttrium-Aluminum Oxide (YALO) doped with high concentrations of Holmium ions (>15% atomic) and a much lower $Pr^{3+}$ concentration (~0.01%). An increase in Holmium concentration allowed efficient lasing of the $^5I_6$-$^5I_7$ transition at 2.94 μm while the $Pr^{3+}$ ion selectively quenched the lifetime of the terminal laser level, thereby breaking the bottleneck of the normally self-terminating laser transition.

Another method for efficient depletion of the $^5I_7$ level can be accomplished by proper selection of the pump wavelength where the laser material exhibits not only ground state absorption but also excited state absorption from the $^5I_7$ level. Pumping from a terminal laser level $^5I_7$ of the 1.67 μm transition will create conditions similar to a four-level laser and potentially allow such a laser to be scaled to higher average powers, higher repetition rates or possibly even to the CW regime. CW operation of Ho doped fluoride fiber laser based on normally self-terminating transition at 2.9 μm with the $^5I_7$ manifold as a terminal laser level was reported by L. Wetenkamp, "Efficient CW operation of a 2.9 μnm $Ho^{3+}$-doped fluorozirconate fiber laser pumped at 640 μnm," Electron. Letters, Vol. 26, (1990). The CW regime of lasing has been established with both pump wavelengths: 640 nm and 750 nm. A Holmium ion exhibits a number of matching resonant ground state and excited state absorption transitions between equally spaced energy levels. For example, a two-step pumping at 640 nm excites Holmium ions from $^5I_8$ to $^5F_5$ and from $^5I_7$ to $^5F_3$ energy levels, while 750 nm pumping allows excitation of Holmium ions from $^5I_8$ to $^5I_4$ and from $^5I_7$ to $^5S_2$ energy levels. Excited state absorption at both pumping wavelengths removes the population from the $^5I_7$ manifold thereby effectively reducing the lifetime of the lower laser level. Two-step absorption is also described by A. M. Tabirian, "New, efficient, room temperature mid-infrared laser at 3.9 μm in $Ho:BaY_2F_8$ and visible $Pr:LiYF_4$ laser for holography," Ph.D. Dissertation, Physics Department/School of Optics, UCF, (2000), in which resonant pumping of Ho:BYF and Ho:YLF at high power densities at 750 nm results in strong depletion of the $^5I_7$ population.

In $Ho:LiYF_4$ (Ho:YLF), laser action at 1.67 μm is observed using short pulse resonant pumping of the $^5S_2$ manifold by a frequency-doubled Nd:glass laser. See L. Esterowitz, R. C. Eckard, and R. E. Allen, Appl. Phys. Lett., 35, 236, (1979) and U.S. Pat. No. 4,321,559 to L. Esterowitz. By lasing the $^5S_2$-$^5I_5$ transition at 1.39 μm, the excited state population could be directly transferred to the intermediate level $^5I_5$, which serves as the upper level for a subsequent laser transition. In this manner, both the $^5S_2$-$^5I_5$, $^5I_5$-$^5I_7$ (1.392 μm, 1.673 μm) and $^5S_2$-$^5I_5$, $^5I_5$-$^5I_6$ (1.392 μm, 3.914 μm) cascade transitions were successfully lased at room temperature. Operation at these wavelengths has been limited, however, by a need to tune the laser pump to the absorption peak of the $^5S_2$ manifold, near 535 nm. This wavelength matches up poorly with most readily available lasers, which was one of the factors precluding practical application of such cascade lasers. Accordingly, numerous approaches to identifying a better pump source for $Ho^{3+}$ fluorides have been described in the art as shown by the following references: A. M. Tabirian, "New, efficient, room temperature mid-infrared laser at 3.9 μm in $Ho:BaY_2F_8$ and visible $Pr:LiYF_4$ laser for holography," Ph.D. Dissertation, Physics Department/School of Optics, UCF, (2000), and A. M. Tabirian, S. C. Buchter, H. P. Jenssen, A. Cassanho, H. J. Hoffman, "Efficient, room temperature cascade laser action at 1.4 μm and 3.9 μm in $Ho:BaY_2F_8$,", CLEO'99, Technical Digest 391, (1999) and U.S. Pat. No. 6,269,108 to A. M. Tabirian.

In one proposed pumping scheme, a commonly available Q-switched, frequency doubled Neodymium (Nd):YAG laser at 532 nm was used for off-peak pumping of Ho:BYF crystal with high levels of dopant concentration, which were chosen for maximizing the resonant pump absorption. Cascade laser action at 1.4 μm and 3.9 μm was demonstrated in 10% Ho:BYF with low thresholds and near-theoretical quantum efficiency. Another pumping scheme allowed the 3.9 μm energy to be scaled over 30 μmJ while achieving 14.5% slope efficiency by employing a direct resonant pumping of the upper laser level with a free running pulsed Cr:LiSAF laser tuned to 890 nm.

Such a system was based on high concentration crystals selected only for the purposes of optimization of pump absorption in end pump geometry in a relatively weak band around 890 nm. It was not realized at that time, however, that the high concentrations are crucial for the efficient laser action at 3.9 μm due to favorable combination of two nonradiative energy transfer processes: efficient cross relaxation populating the upper laser level and upconversion depleting the lower laser level of the 3.9 μm transition. Crystals with high Holmium concentrations, however, are not capable of producing efficient laser oscillation at the single wavelength of 1.67 μm. The main reason for this incapacity is a strong cross-relaxation in the host material that leads to a very fast build-up of population on the lower laser level and therefore, to self-termination of laser action. Moreover, in order to utilize higher concentration crystals for efficient generation of 1.67 µm laser radiation, special techniques of pumping, cascade lasing and co-doping would be required. Lasing of Holmium doped fluorides in general and BYF in particular at 1.67 µm has not been described by the prior art. Additionally, the high concentration samples described in the prior art would not allow efficient lasing at 1.67 µm as needed for practical applications.

SUMMARY OF THE INVENTION

An exemplary embodiment of the present invention provides efficient room temperature laser operation at 1.67 µm with a Holmium-doped fluoride crystal (e.g., BYF, YLF, NYF, KYF) or fluorozirconate ZBLAN glass fiber resonantly pumped by a pulsed laser source with a pulse duration substantially matching the storage time of the upper laser level to allow population inversion between the upper $^5I_5$ level and the relatively long lived lower laser level $^5I_7$.

Another exemplary embodiment of the present invention provides a laser having a Holmium doped fluoride crystal as a 1.67 µm down-converter for a shorter wavelength laser, such as those available as a commercial source. Examples of such sources include a Cr:LiSAF laser, high power laser diode arrays or a Ti:sapphire laser—all tuned to about 885 nm.

Another exemplary embodiment of the present invention generates one or more different infrared wavelengths, specifically including the wavelengths around 1.67 µm alone or followed by 2.06 µm, utilizing resonant pumping of a Holmium-doped fluoride crystal with a shorter wavelength pump laser.

Another exemplary embodiment of the present invention provides an ability to efficiently accomplish down-conversion utilizing short pump pulse lasers, thereby gain switching the transitions near 1.67 µm alone or followed by 2.06 µm so as to produce short (e.g., nanoseconds) pulses at these infrared wavelengths.

Another exemplary embodiment of the present invention provides methods for generating the transitions near 1.67 µm alone or in a cascade with 2.06 µm at output energies scalable to over 80 µmJ at low repetition rates and to over 10 µmJ at repetition rates scalable to over 10 Hz.

Still another exemplary embodiment of the present invention provides a laser for generating energy scalable infrared radiation around 1.67 µm alone or in sequence with 2.06 µm at room temperature using a resonant pump source with a pulse duration sufficiently long to allow efficient pumping throughout an entire storage time of the laser material. In a long-pulse pumping scheme, pump power densities are well above the threshold for sustained laser oscillation while staying below the damage threshold of sensitive IR coatings and the laser material itself. In various embodiments of the invention such pump sources may include quasi-CW laser diode arrays; free running or long pulse tunable Cr:LiSAF or Ti:sapphire lasers.

Another exemplary embodiment of the present invention provides an efficient method of generating short pulses at 1.67 µm or 2.06 µm by pumping Holmium doped fluorides with long pulses at 890 nm with pulse duration substantially matching the storage time of the gain material and Q-switching the 1.67 µm or 2.06 µm lasers.

Yet another exemplary embodiment of the present invention provides laser gain materials suitable for use in a laser-pumped 1.67 µm laser based on the Holmium $^5I_5$-$^5I_7$ transition. For the purpose of generating 1.67 µm wavelength, fluoride crystals are advantageous host materials for the Holmium ions due to low multiphonon non-radiative transition rates, which would otherwise inhibit fluorescence at that wavelength. While for the 3.9 µm laser with resonant pumping at 890 nm described in the U.S. Pat. Nos. 6,269,108 and 6,567,431, higher concentrations of Holmium ions were more preferred, the laser action at 1.67 µm alone upon resonant pumping at 890 nm is more efficient at lower concentrations due to low non-radiative energy transfer rates to the terminal laser level $^5I_7$.

Still another exemplary embodiment of the present invention provides an alternative pumping technique for a 1.67 µm laser by utilizing a fortuitous coincidence of ground state absorption and excited state absorption of Ho doped fluorides, in which the excited state absorption efficiently depletes the relatively long lived terminal lasers level $^5I_7$ and creates conditions similar to a four-level laser. Pumping at 640 nm will result in the two step absorption of $^5I_8 \rightarrow ^5F_5$, $^5I_7 \rightarrow ^5F_3$, while pumping at 750 nm will excite Ho ions from $^5I_8$ to $^5I_4$ and from $^5I^7$ to $^5S_2$. In various embodiments of the invention such pump sources may include laser diode arrays at 640 nm and 750 nm; free running or long pulse tunable Cr:LiCAF lasers, Alexandrite lasers or Ti:sapphire lasers at 750 nm and dye lasers at 640 nm.

Still another exemplary embodiment of the present invention optimizes the 1.67 µm laser performance by the addition of a small amount of such co-dopants as $Pr^{3+}$ and $Eu^{3+}$, thereby selectively quenching the lifetime of the lower laser level $^5I^7$ of $Ho^{3+}$ in fluoride crystals or ZBLAN glass fibers. Both methods, co-doping and alternative pumping at 640 nm or 750 nm, could be used in combination for further performance enhancement of the 1.67 µm laser.

Yet another exemplary embodiment of the present invention utilizes a 1.67 µm source as a laser illuminator for eye-safe range gated imaging systems with extended Short-Wavelength Infrared (SWIR) performance that can be achieved through the higher energy available from a 1.67 µm illuminator.

Another exemplary embodiment of the present invention utilizes a 1.67 µm source operating in the short pulse regime as a transmitter for an eye-safe 3-D imaging LADAR system. While still another exemplary embodiment of the present invention utilizes a 1.67 µm source operating in the short pulse regime as a transmitter, such as for a covert range finding system.

Other advantages and features of the present invention will become apparent from the following detailed description of the preferred embodiments of the invention, from the accompanying drawings and claims.

BRIEF DESCRIPTION OF THE DRAWINGS

Figure 1:
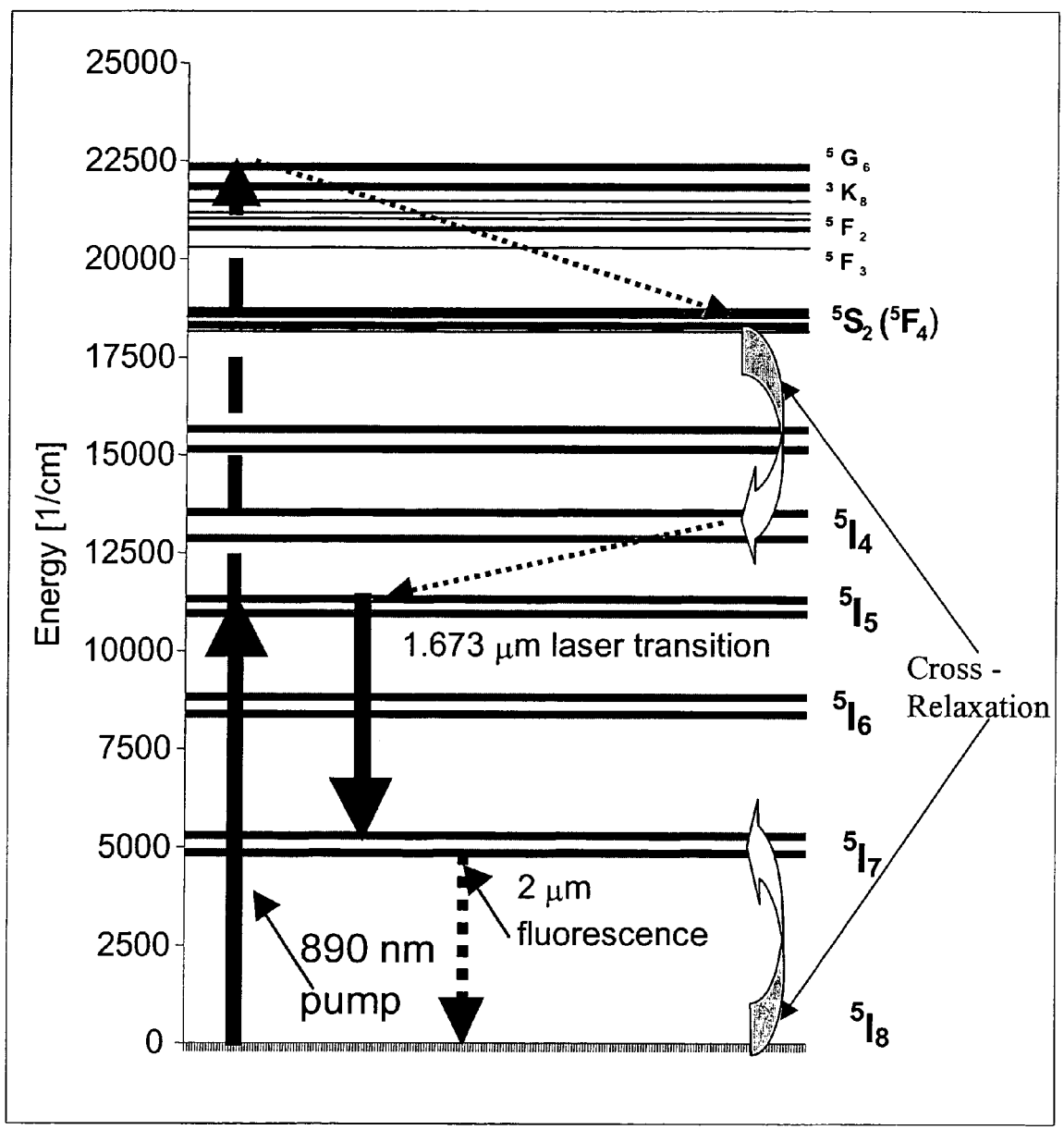
Figure 2A:
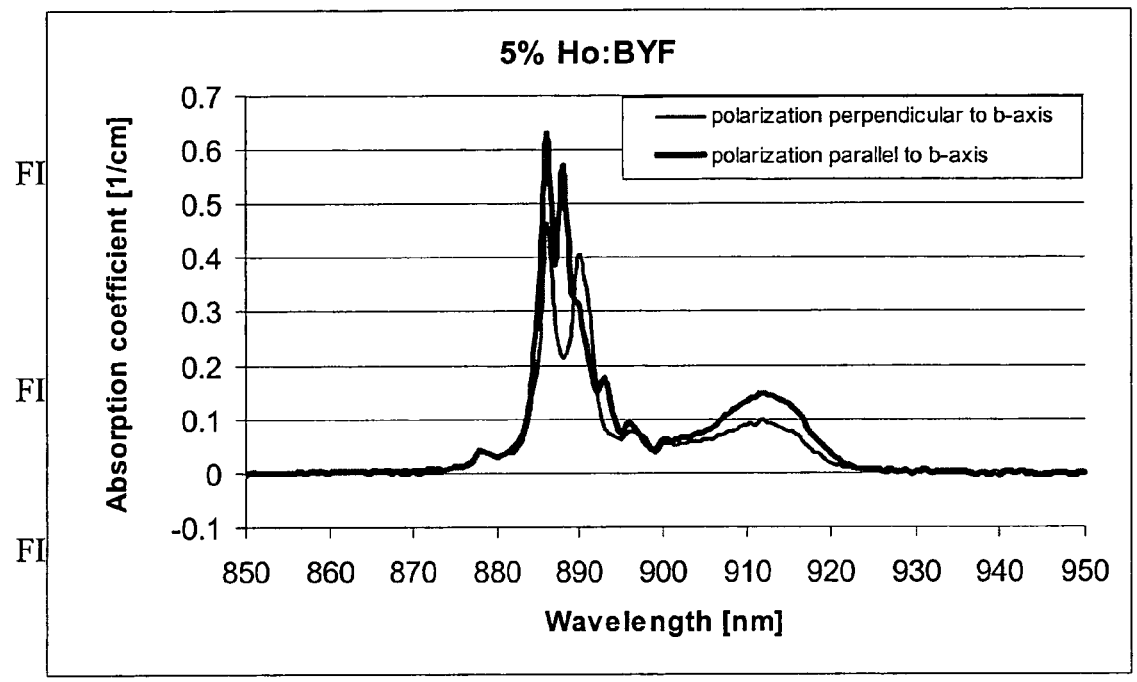
Figure 2B:
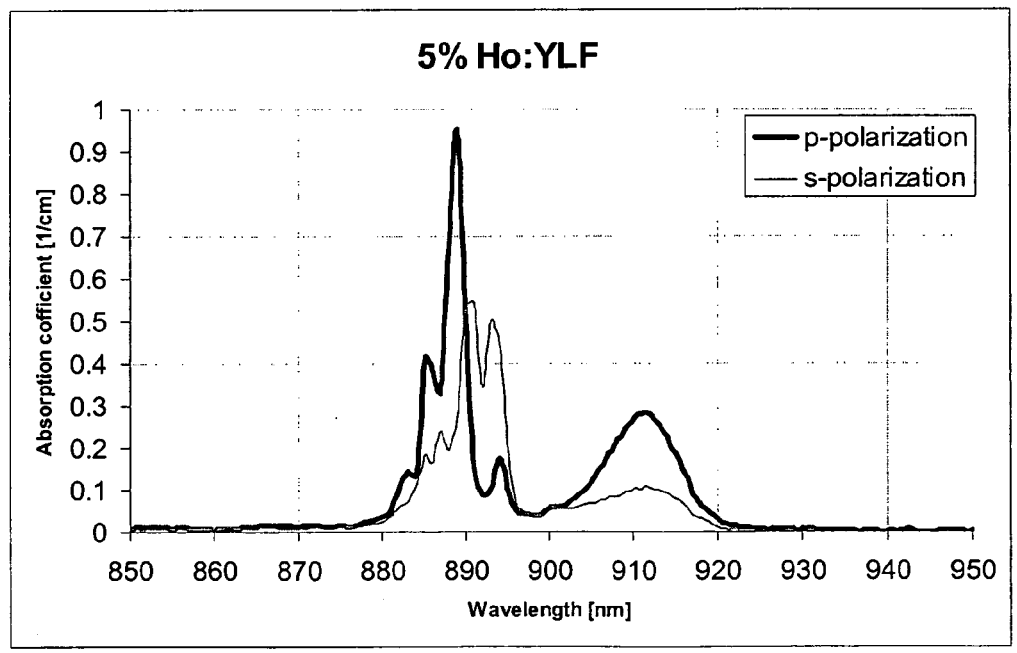
Figure 3:
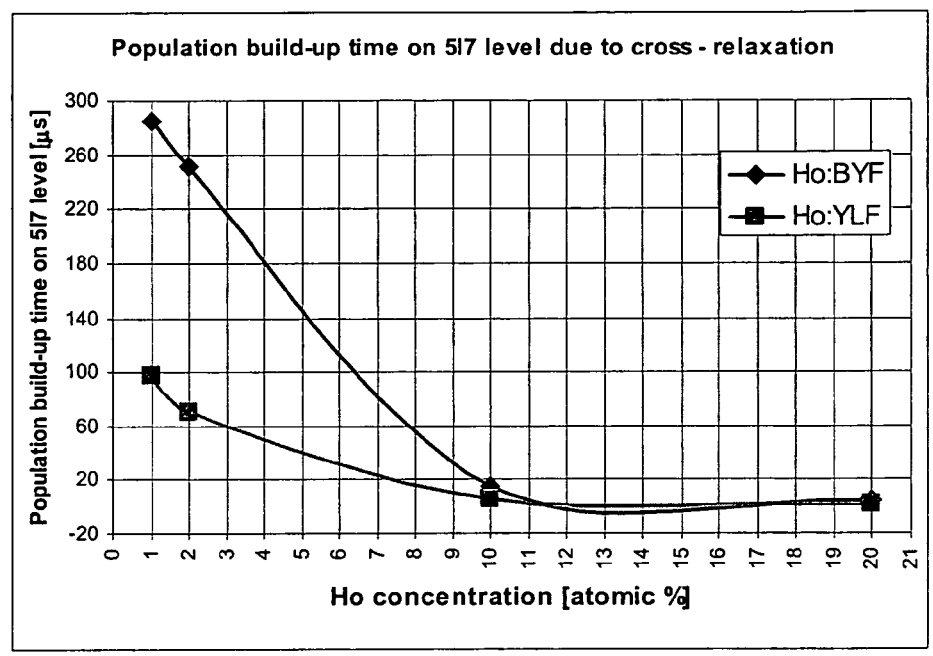
Figure 4:
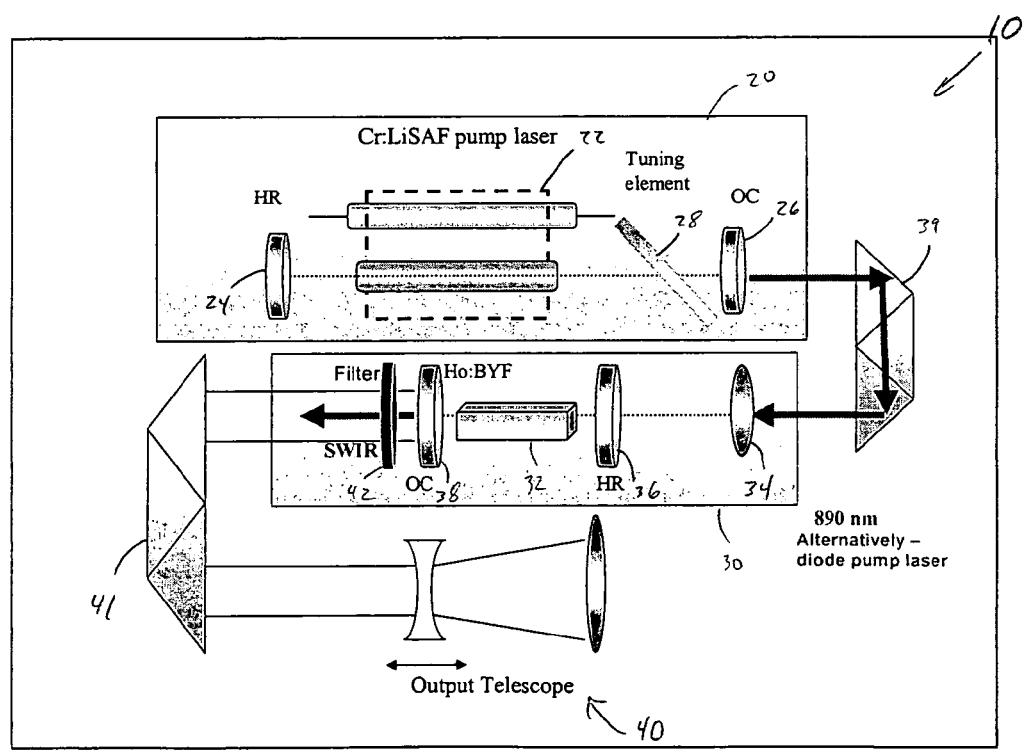
Figure 5A:
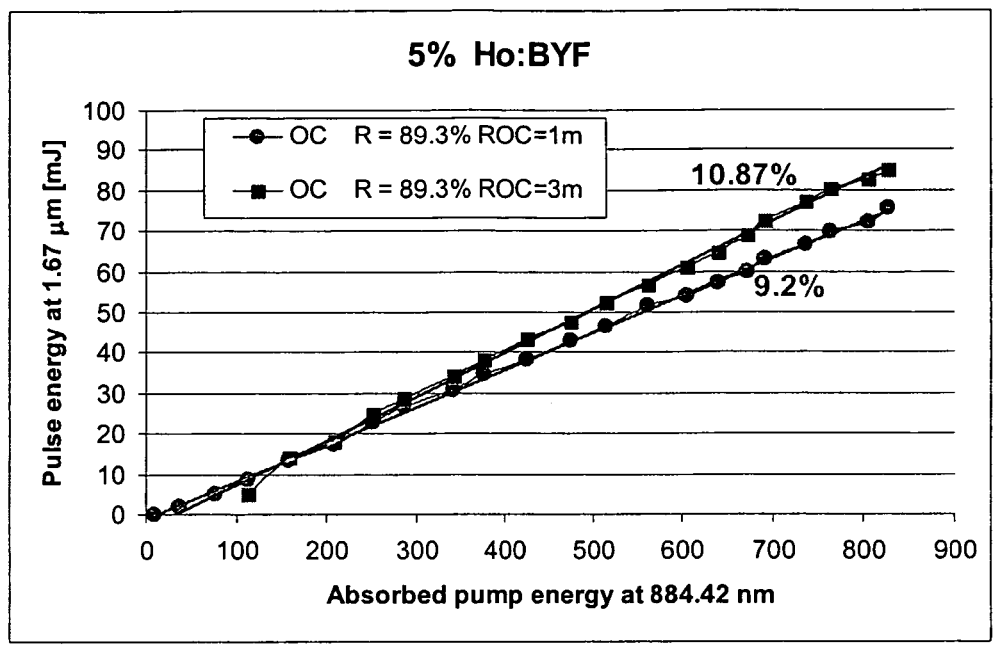
Figure 5B:
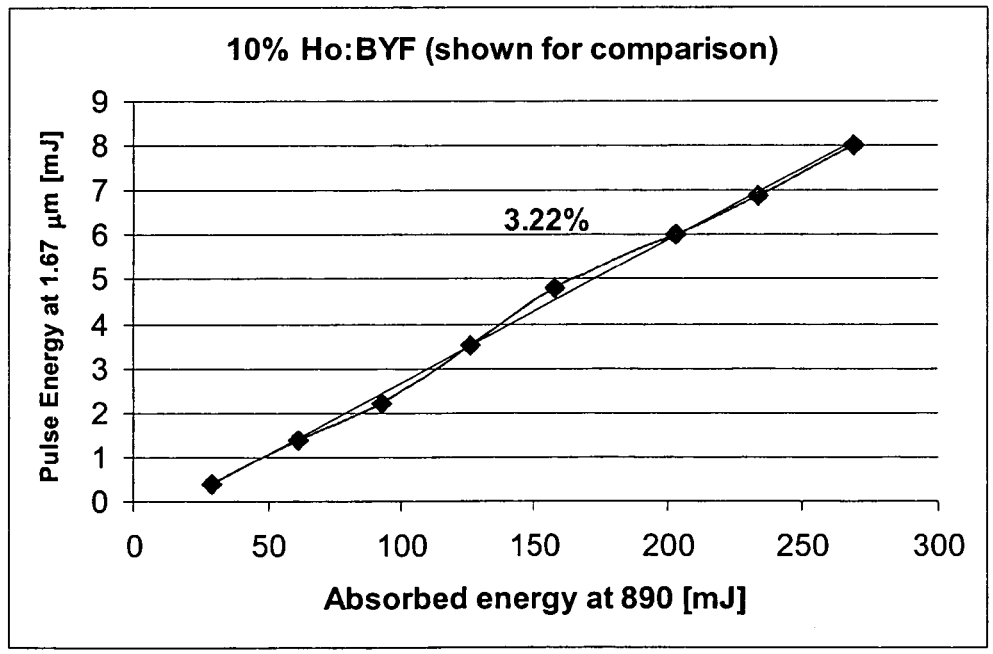
Figure 6A:
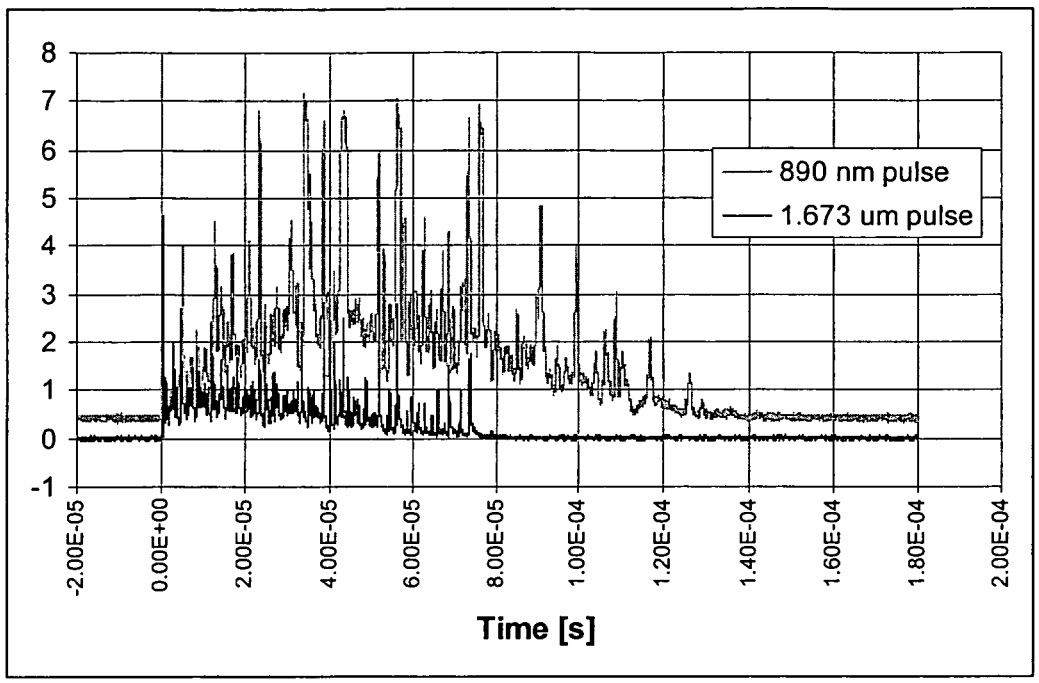
Figure 6B:
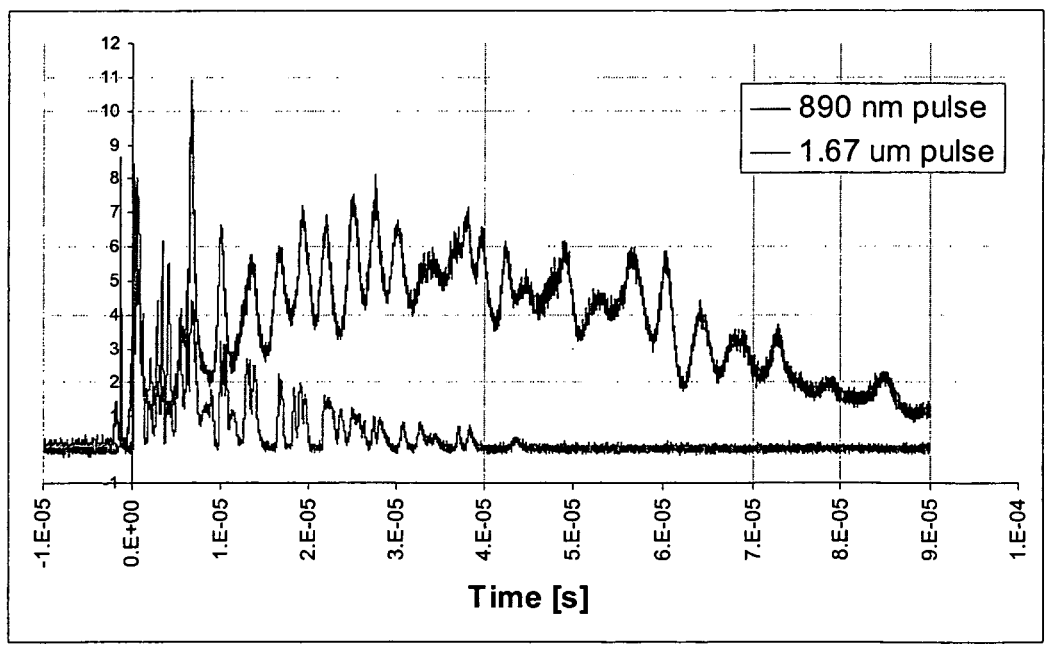
Figure 7:
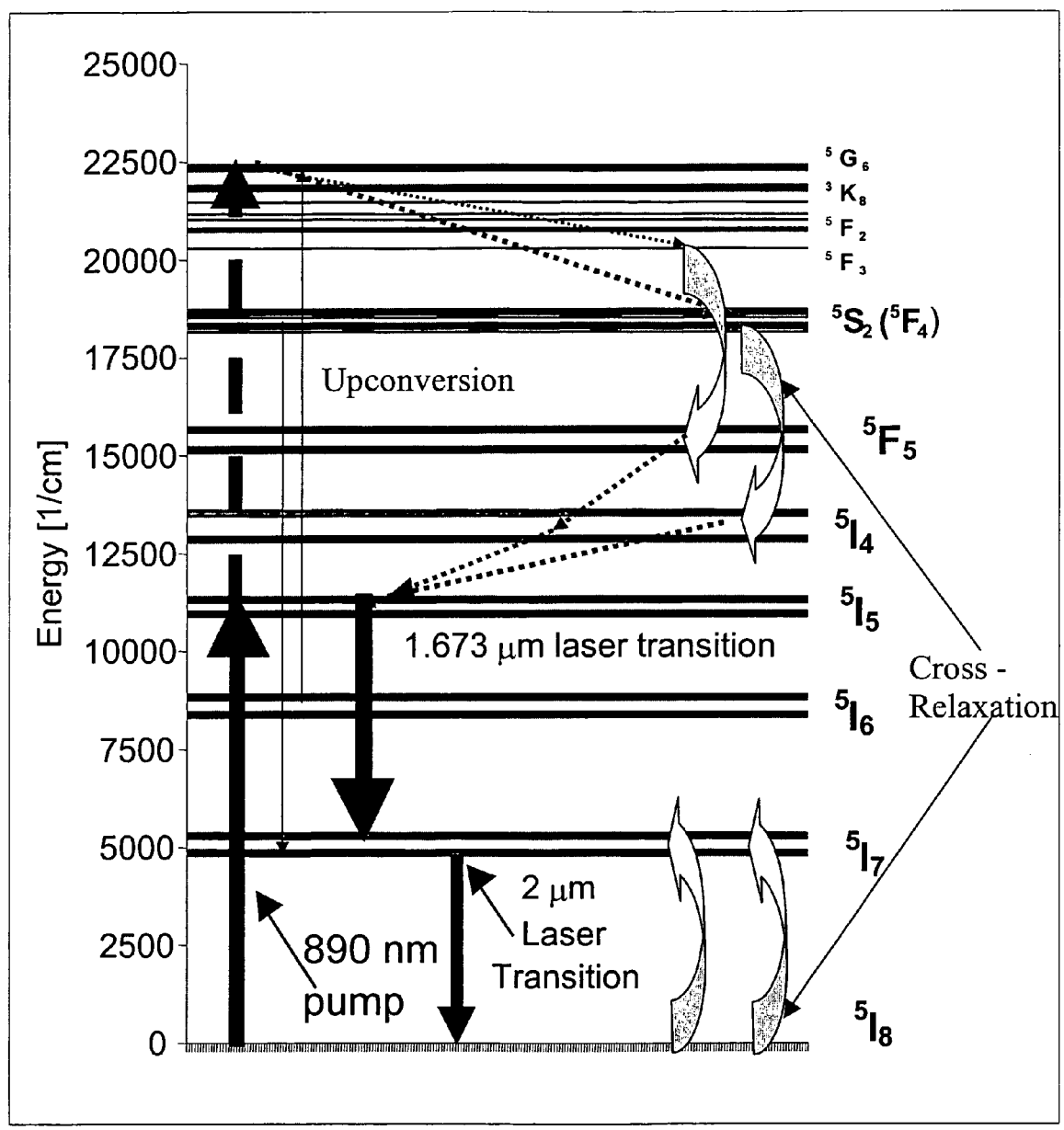
Figure 8:
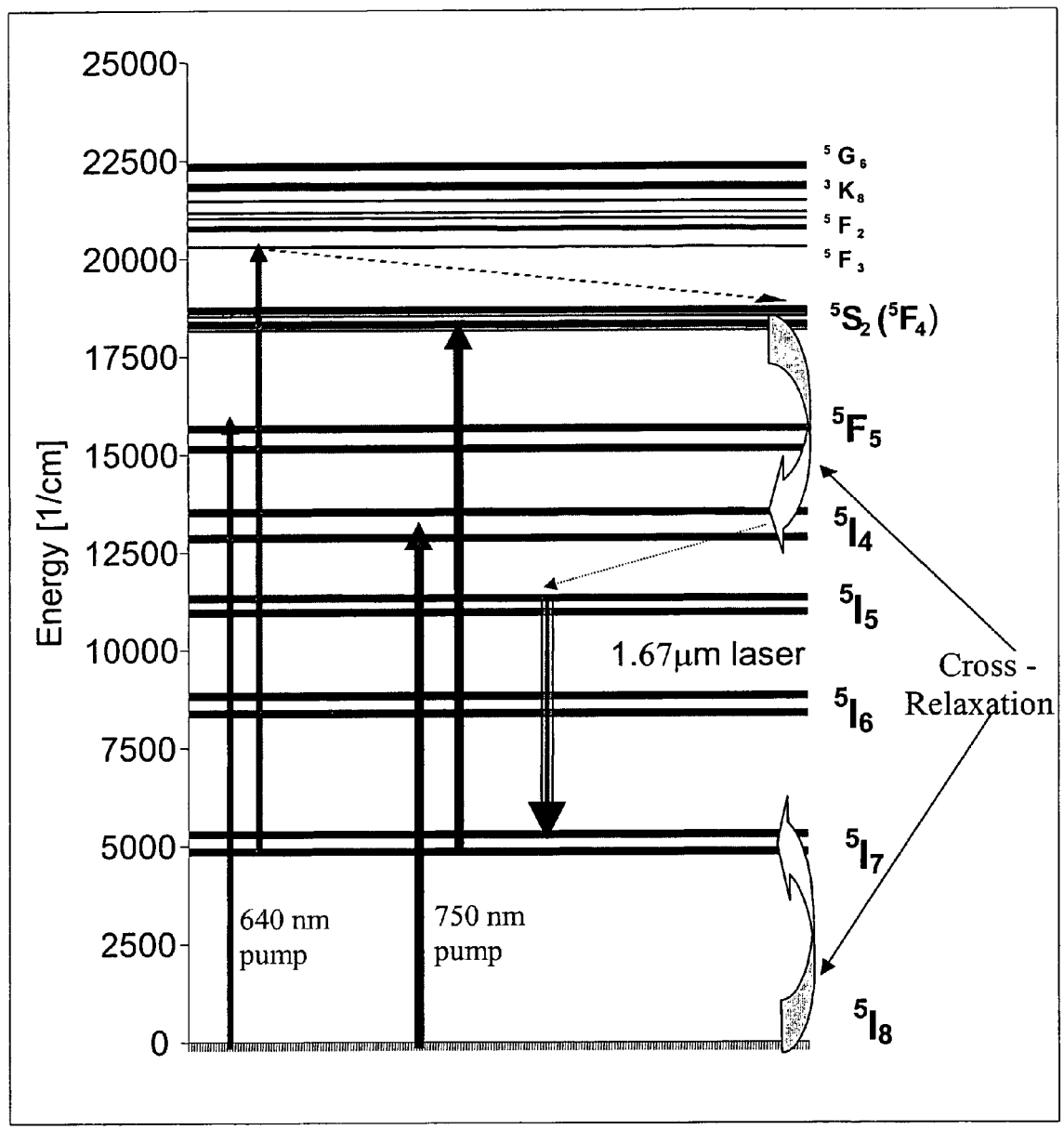
Figure 13A:
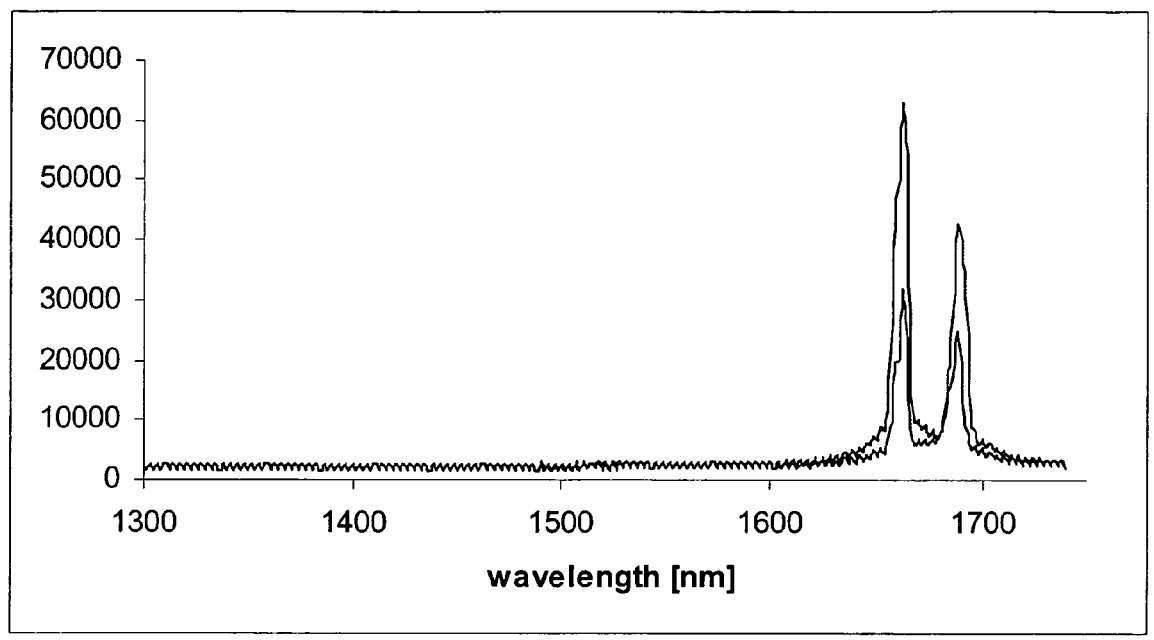
Figure 13B:
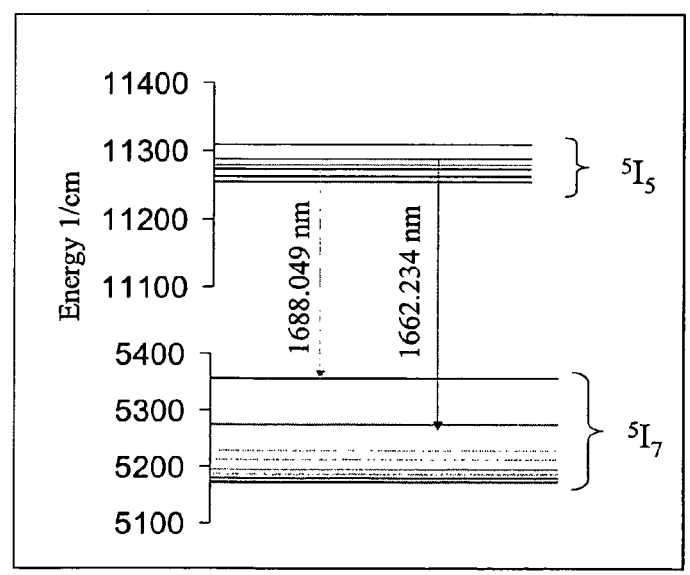
Figure 14A:
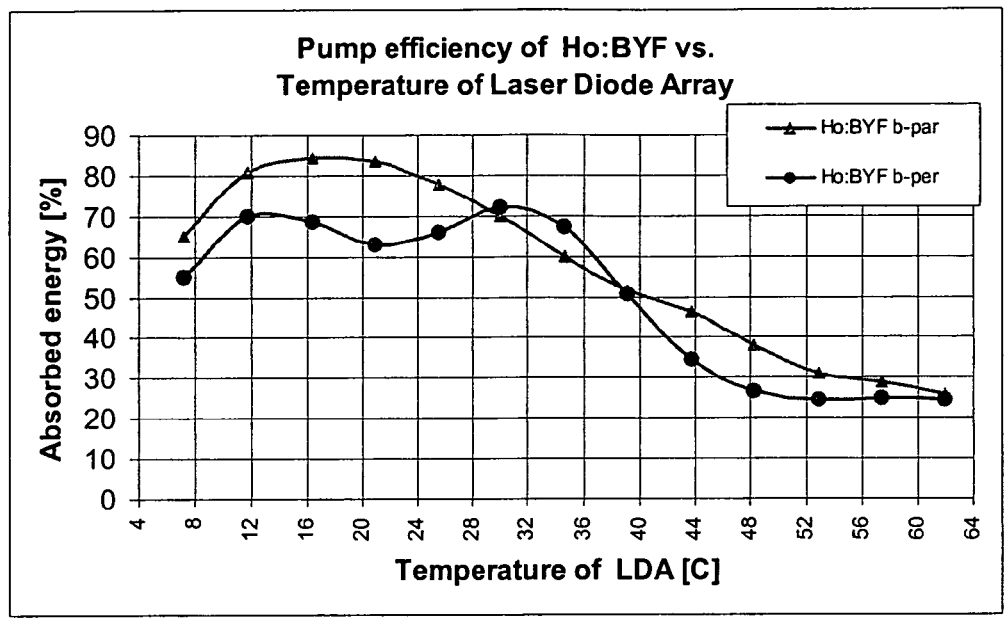
Figure 14B:
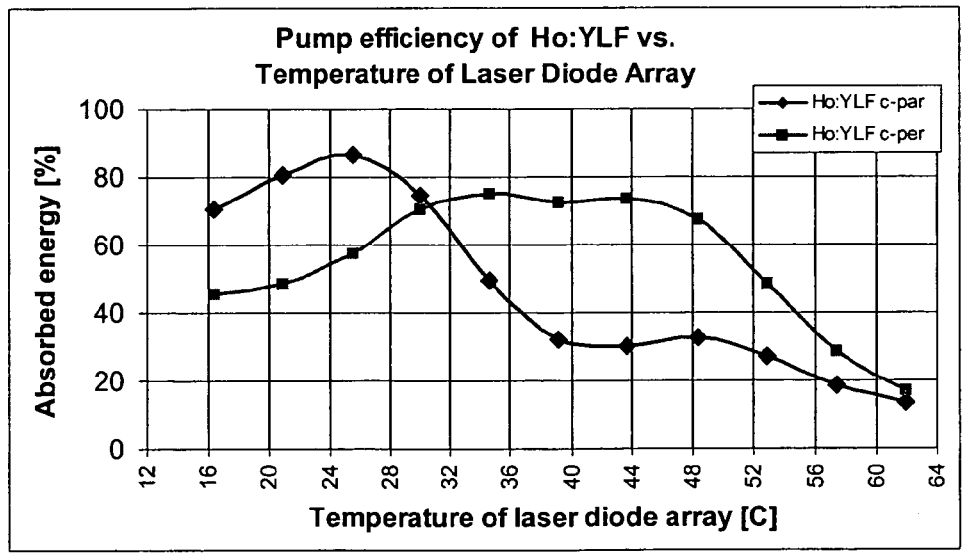
Figure 15:
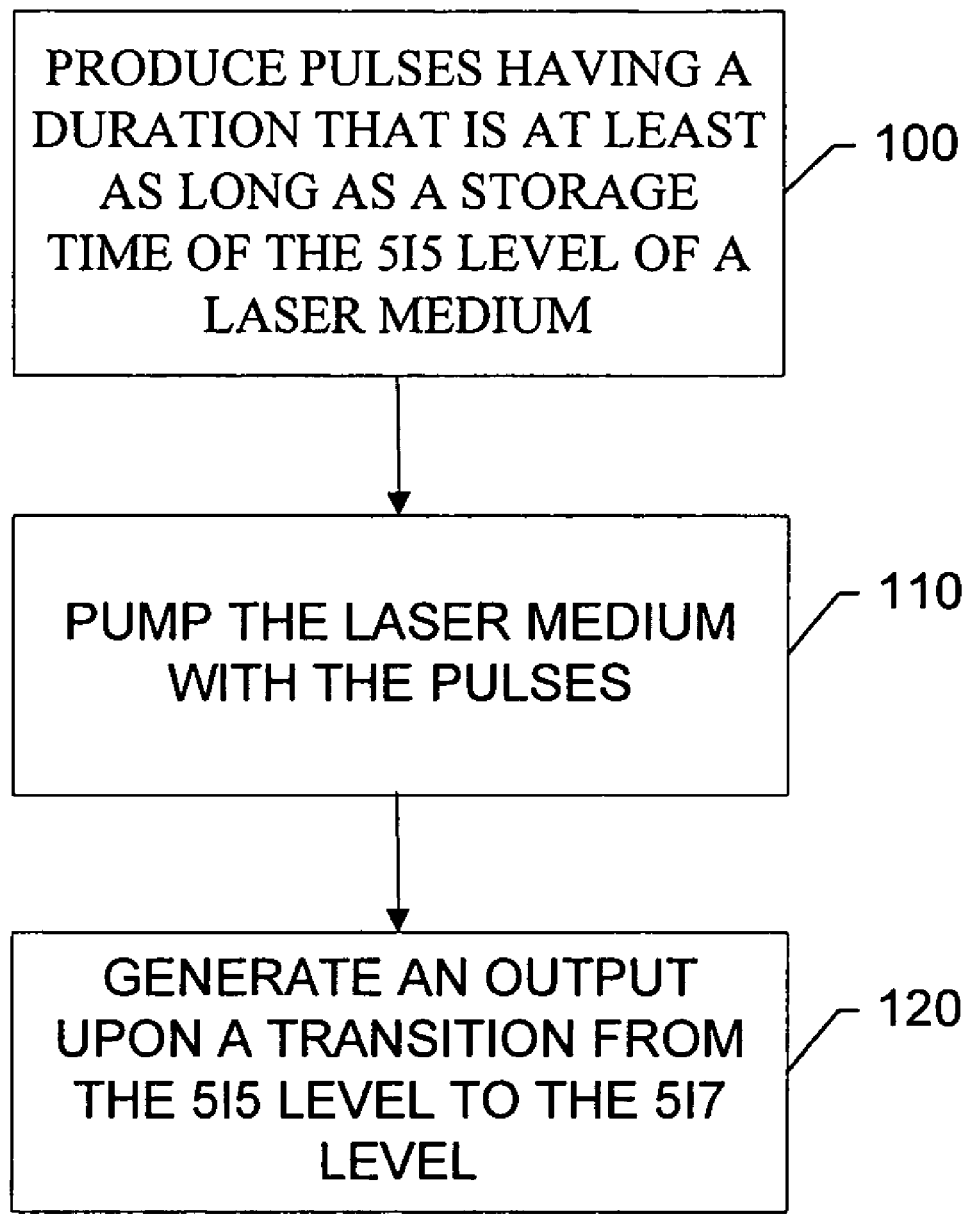

Having thus described the invention in general terms, reference will now be made to the accompanying drawings, which are not necessarily drawn to scale, and wherein:

FIG. 1 is an energy level diagram with a direct pulsed resonant pumping scheme of an upper level of a 1.67 µm laser transition in $Ho^{3+}$ doped fluorides according to an exemplary embodiment of the present invention;

FIGS. 2a and 2b are graphs depicting a polarized absorption spectra of Ho:BYF and Ho:YLF, respectively, around 890 nm, according to an exemplary embodiment of the present invention;

FIG. 3 is a graph of population build-up time constants on a terminal laser level of a 1.67 µm transition due to cross-relaxation as a function of Holmium concentration, according to an exemplary embodiment of the present invention;

FIG. 4 is an optical layout for one exemplary embodiment of a laser system of the present invention in an illuminator configuration for generating radiation at 1.67 µm from a Holmium doped fluoride crystal using long pulse resonant pumping at 890 nm;

FIGS. 5a and 5b are graphs depicting 1.67 µm laser performance as a function of absorbed input energy at 890 nm in 5% Ho:BYF and in 10% Ho:BYF, respectively, according to an exemplary embodiment of the present invention;

FIGS. 6a and 6b are graphs of a temporal profile of a pump pulse at 890 nm for producing a 1.67 µm laser pulse in 5% Ho:BYF and in 10% Ho:BYF, respectively, according to an exemplary embodiment of the present invention;

FIG. 7 is a Holmium energy level diagram depicting a cascade lasing scheme at 1.67 µm and 2.06 µm, according to an exemplary embodiment of the present invention;

FIG. 8 is a Holmium energy level diagram with alternative pumping schemes for the 1.67 µm laser at 640 nm and 750 nm, according to an exemplary embodiment of the present invention;

FIGS. 9a and 9b are graphs showing nonlinear transmission at 750 nm as a function of a translation coordinate Z along a focused pump beam: in 10% Ho:BYF and in 20% Ho:BYF, respectively, according to an exemplary embodiment of the present invention;

FIGS. 10a and 10b are graphs showing emission from the $^5I_5$ level at 915 nm with CW pumping at 750 nm as a function of the translation coordinate along a focused pump beam in Ho:BYF and in Ho:YLF, respectively, according to an exemplary embodiment of the present invention;

FIGS. 11a and 11b are graphs showing emission from the $^5I_7$ level at 2060 nm with CW pumping at 750 nm as a function of a translation coordinate along a focused pump beam in Ho:BYF and in Ho:YLF, respectively, according to an exemplary embodiment of the present invention;

FIG. 12 shows a beam profile of a 1.67 µm laser, according to an exemplary embodiment of the present invention;

FIGS. 13a and 13b are graphs showing a wavelength spectrum of a 1.67 µm laser and laser transitions corresponding to an output wavelength, respectively, according to an exemplary embodiment of the present invention;

FIGS. 14a and 14b are graphs of the pump absorption efficiency of Ho:BYF and Ho:YLF, respectively, relative to the temperature of a laser diode array, according to an exemplary embodiment of the present invention; and FIG. 15 is a flowchart illustrating a method for generating an eye-safe laser beam at room temperature according to an exemplary embodiment of the present invention.

DETAILED DESCRIPTION OF THE INVENTION

The present invention will now be described more fully hereinafter with reference to the accompanying drawings, in which some, but not all embodiments of the invention are shown. Indeed, the invention may be embodied in many different forms and should not be construed as limited to the exemplary embodiments set forth herein; rather, these embodiments are provided so that this disclosure will satisfy applicable legal requirements.

Referring now to the drawings, a description will be given in detail of various exemplary embodiments in accordance with the present invention. As described above, a laser may be constructed having a host material advantageously being a fluoride, such as BYF or YLF, although the host material may be comprised of other fluoride materials such as fluorozirconate ZBLAN glass, NaYF$_4$ (NYF) and KY$_3$F$_{10}$ (KYF). An energy level diagram for Ho$^{3+}$ with a direct resonant pumping scheme of a 1.67 µm laser is shown in FIG. 1. A 1.67 µm laser transition occurs between the $^5I_5$ and $^5I_7$ manifolds. In one exemplary embodiment, radiation from a pump laser is tuned to an absorption peak of Ho:BYF or Ho:YLF around 888 nm. Absorption spectra around 888 nm in both materials are shown in FIGS. 2a and 2b, respectively. The pump laser excites Ho$^{3+}$ ions from ground state $^5I_8$ to a metastable level $^5I_5$ with a cross section $\sigma^{GSA}=9.496 \cdot 10^{-22}$ cm$^2$ in BYF and $\sigma_{GSA}=1.446 \cdot 10^{-21}$ cm$^2$ in YLF. Spectroscopic studies indicate that both BYF and YLF doped with Ho$^{3+}$ ions also exhibit excited state absorption at 890 nm by elevating some Ho$^{3+}$ ions from the $^5I_5$ manifold to the $^5G_6$ level. Ho$^{3+}$ ions that are initially excited to the $^5G_6$ level experience multiphonon relaxation to $^5F_3$ and then to $^5S_2$ manifolds. A cross section of excited state absorption $\sigma_{ESA}$, according to preliminary estimates, is less than about 10% of $\sigma_{GSA}$. An amount of the ions elevated above the $^5I_5$ level in low concentration crystals is assumed to be small compared to a population circulating between the $^5I_8$ and $^5I_5$ levels and is treated as a loss since the radiative decay from higher levels in low concentration crystals dominates over alternative (fast) relaxation mechanisms and actual contribution of excitation to the upper laser level $^5I_5$ is both inefficient and occurs within the time scale exceeding useful storage time of that level.

As discussed above, the upper level $^5I_5$ of a 1.67 µm laser has a rather short lifetime (50 µs in Ho:BYF and 20 µs in Ho:YLF) compared to the long lifetime of a terminal laser level (17 ms in Ho:BYF and 14 ms in Ho:YLF), which, combined with the rapid nonradiative decay rates between closely spaced levels $^5I_5$ and $^5I_6$, in general, creates conditions unfavorable for lasing. Experimental measurements and numerical simulations of the dynamics of build up and decay rates of the populations on Ho$^{3+}$ levels upon direct pulsed pumping of the $^5I_5$ level, have shown however, that in low concentration crystals, the inversion of population between the levels $^5I^5$ and $^5I_7$ can be achieved for an initial interval of time comparable with the lifetime of the $^5I_5$ level. For efficient 1.67 µm laser action in low concentration crystals, it is, therefore, advantageous to pump Ho$^{3+}$ ions with a 890 nm laser pulse with a duration comparable to the decay time of the upper laser level $^5I_5$.

At high dopant concentrations, spectroscopic measurements indicate that both Ho:BYF and Ho:YLF crystals demonstrate two efficient resonant cross relaxation (CR) processes. In a first resonant cross relaxation process the Ho$^{3+}$ ion in the high lying $^5F_3$ manifold falls to an intermediate level $^5F_5$ while promoting other ions from the ground state $^5I_8$ to the first exited level $^5I_7$. In a second resonant cross relaxation process simultaneous transitions move ions from $^5S_2$ to $^5I_4$ and from $^5I_8$ to $^5I_7$ in a very efficient manner. This shortens a lifetime of the $^5S_2$ level through rapid relaxation from $^5S_2$ to $^5I_4$, followed by multiphonon relaxation from $^5I_4$ to $^5I_5$, and efficiently contributes to a buildup of the population on $^5I_5$, the upper level of the 1.67 µm laser transition. Cross relaxation rates due to simultaneous transitions from $^5S_2$ to $^5I_4$ and from $^5I_8$ to $^5I_7$, are determined by observing a change in the lifetime of the $^5S_2$ manifold at different Ho$^{3+}$ concentrations upon pumping the crystals with 532 nm short pulses. Unquenched lifetimes of the $^5S_2$ manifold are about 97 µs for Ho:YLF and about 284.5 µs for Ho:BYF in low concentration (1%) samples. As the concentration of Ho$^{3+}$ is increased, the lifetime of $^5S_2$ shortens dramatically: 70 μs in 2%, 5.2 μs in 10%, 2 μs in 20% Ho:YLF; and 252 μs in 2%, 15.5 μs in 10%, and 3.7 ls in 20% Ho:BYF.

The transition from $^5I_8$ to $^5I_7$ due to both cross relaxation paths, however, leads to a direct and very fast build-up of population on the terminal laser level $^5I_7$ of the 1.67 μm transition in high concentration crystals. The $^5S_2$ manifold decay time constants represent, at the same time, the population build-up time on the $^5I_7$ manifold due to the second cross relaxation process and simultaneous transitions from $^5S_2$ to $^5I_4$ and from $^5I_8$ to $^5I_7$ (shown in FIG. 3). The cross relaxation rate depends on population of the ground state. In a model based on system of rate equations, used for calculation of population dynamics on Ho$^{3+}$ energy levels, the rate of population removal from $^5S_2$ level due to cross relaxation is expressed as:

$$dN_{5S2}/dt \text{ (due to cross relaxation)} = -\alpha_{CR} N_{5I8} N_{5S2}$$

where $\alpha_{CR}$ is the cross relaxation rate constant, $N_{5I8}$ is the ground state $^5I_8$ population, and $N_{5S2}$ is the population of the $^5S_2$ level. In the nonlinear term $\alpha_{CR} N_{5I8} N_{5S2}$ responsible for cross relaxation, the product $\alpha_{CR} N_{5I8}$ can be interpreted as a cross relaxation rate or the reciprocal of the effective lifetime of the $^5S_2$ level shortened by cross relaxation as:

$$1/\tau_{CR} = \alpha_{CR} N_{5I8}$$

Numerical modeling and analysis show that with high pump power density, it is possible to effectively deplete the ground state population of Ho$^{3+}$ ions in high concentration crystals. The necessary condition for this process is the cross relaxation duplication of excitations in the system of interacting particles following the effective ground state and excited state absorption and upconversion. The depletion of the ground state will lead to slowing of the cross relaxation process by increasing the $\tau_{CR}$ time constant.

The build up time of the $^5I_7$ population due to the first cross relaxation process (i.e., the simultaneous transitions from $^5F_3$ to $^5F_5$ and from $^5I_8$ to $^5I_7$) has not been measured. It has been estimated to be even shorter, however, since the unquenched lifetime of the $^5F_3$ level in low concentration crystals is less than 10 μs. Both processes result in a bottleneck effect on the lower laser level and in self-termination of the laser transition at 1.67 μm.

In high concentration crystals, another energy transfer process, efficient upconversion, also influences the population dynamics of Holmium ions. This process may be observed with pulsed pumping at 890 nm and CW pumping at 750 nm. In the process of upconversion, ions are excited from the $^5I_6$ to $^5F_3$ level while prompting ions in the $^5S_2$ to $^5I_7$ level, thereby additionally contributing to population build-up on the $^5I_7$ level. The ions elevated to the $^5F_3$ level due to upconversion will also cross relax with high probability, promoting other ions from the ground state to the $^5I_7$ level and creating avalanche type build up of population on that level.

Therefore, while high concentration crystals are preferred for the efficient laser action attributable to the $^5I_5$ to $^5I_6$ transition at a wavelength of 3.9 μm, high concentration crystals are not suitable for efficient generation of laser radiation at the single wavelength of 1.67 μm (since both processes lead to a direct and very rapid build-up of population on the terminal laser level $^5I_7$ of this transition). These conclusions have been confirmed by experimental demonstrations of laser action at 1.67 μm in different concentration crystals.

In the advantageous exemplary embodiment shown in FIG. 4, an eye-safe laser 10 (or 1.67 μm laser) is assembled in a folded configuration, such as used as an illuminator for imaging systems. However, the eye-safe laser 10 may have other configurations and other components in other embodiments and for other applications. In the illustrated embodiment, however, the eye-safe laser 10 includes a laser source 20, a laser cavity 30 and an output telescope 40. In an exemplary embodiment, the laser source 20 includes a flashlamp pumped free running tunable Cr:LiSAF laser 22 pumping radiation in an end pumped geometry. The laser source 20 further includes an HR coated mirror 24 disposed at a first end of the pumped laser 22, an output coupler 26 disposed at a second end of the pumped laser 22 and a tuning element 28 disposed between the output coupler 26 and the second end of the pumped laser 22. An output beam of the laser source 20 is folded back into the laser cavity 30, for example, via a first corner cube 29. An output beam of the laser cavity 30 is folded back into the output telescope 40 via, for example, a second corner cube 41.

In an exemplary embodiment, the laser source 20 is capable of producing 70 μs long pulses with energies up to 1 J per pulse at a wavelength of 885 nm. Pump radiation tuned to a peak of absorption of a laser crystal 32 of the laser cavity 30 excites Holmium ions directly into the upper level $^5I_5$ of the 1.67 μm laser transition. The output beam of the laser source 20 is folded via the first corner cube 29 and passed through a long focal length positive lens 34, which focuses the output beam of the laser source 20 into a small area, about 900 microns full-width at half-maximum (FWHM), in a center of the laser crystal 32. The pump radiation inverts the population densities of the $^5I_5$-$^5I_7$ laser transition to provide for stimulated emission of radiation at a resonant wavelength of an optical cavity formed by an input mirror 36 and an output mirror 38. The output mirror 38 is partially transmissive at an output wavelength of the laser cavity 30 for extracting a portion of the stimulated radiation within the laser crystal 32 as the output beam of the laser cavity 30. In one exemplary embodiment, the input mirror 36 is greater than about 85% transmissive to radiation at the pumping wavelength and is greater than about 99.8% reflective of stimulated emission of radiation within the laser crystal 32 at the output wavelength. In one exemplary embodiment, a radius of curvature of the input mirror 36 is 0.75 m. The output mirror 38 is partially transmissive at 1.67 μm with, in one embodiment, reflectivities ranging between about 68% and up to about 97.6% and the radii of curvature ranging between about 1 m to flat.

In an exemplary embodiment, the laser crystal 32 is preferably formed as an elongated slab with a length ranging between about 35 mm to about 37 mm, which is selected to provide an adequate absorption of the output beam of the laser source 20 and to provide a resonant mode of the optical cavity, defined by the input and output mirrors 36 and 38, at the wavelength of 1.67 μm. In other examples, the laser crystal 32 may be shaped as a rod with a highly polished barrel positioned in a completely reflective pump cavity or as a totally internally reflecting slab such that the pumping with diodes or other pump lasers may be accomplished from the side of the rod or slab laser crystal. In an exemplary embodiment, the output of the 1.67 μm Ho:BYF laser is filtered through a 1.5 μm longpass silicon filter 42 in order to separate it from the pump radiation at 885 nm. Energy of a 1.67 μm laser pulse may be measured, for example, with a Molectron JD2000 energy meter.

In an advantageous embodiment, the laser crystal 32 comprises BYF doped with rare-earth ions of Holmium at a relatively low concentration of about 5%. As this example illustrates, one aspect of the present invention is the selection of low concentrations for optimization of energy transfer processes (e.g., minimization of cross relaxation and upconversion) for increased performance efficiency of the eye-safe laser 10 operating at a single wavelength of 1.67 µm and for scaling the eye-safe laser 10 to high energies. As described below, selection of the dopant concentration for a 1.67 µm laser is not only determined by absorption maximization as described by U.S. Pat. Nos. 6,269,108 and 6,567,431, but rather by conditions for sustaining the population inversion for the longest possible time. The Ho:BYF sample on one embodiment is cut along a [001] direction and with b- and a-axes parallel to the sides of the laser crystal 32. The pumped laser 22 output may be polarized in a horizontal plane, and the eye-safe laser 10 performance was evaluated for two different orientations of pump polarization with respect to the crystal axes: with the pump polarization parallel to b- and a-axes. In both cases the eye-safe laser 10 output-stimulated emission at 1.67 µm was parallel to the b-axis. Additionally, the eye-safe laser 10 of this embodiment demonstrated its best performance while pumped along the b-axis.

In another exemplary embodiment, a laser medium may be either a Holmium-doped fluoride crystal, or a fluorozirconate ZBLAN glass fiber. The laser medium may be resonantly pumped by a pump source such that the laser medium produces an output upon a transition from the $^5I_5$ level to the $^5I_7$ level. The pump source produces pulses having a duration that is at least as long as a storage time of the $^5I_5$ level of the laser medium. For example, the pump source may be tuned to produce a pulse signal at a wavelength of about 890 nm to pump the laser medium to generate an output at a wavelength of about 1.67 µm (see for example, FIG. 1). Alternatively, other pump sources may produce an output having a wavelength of about 1.67 µm, responsive to pumping with signals having a wavelength of about 640 nm or signals having a wavelength of about 750 nm (see for example, FIG. 8). As yet another alternative, a pump source at a wavelength of about 890 nm may pump the laser medium such that the laser medium produces a first output having a wavelength from about 1.4 µm to about 1.7 µm in cascade with a second output having a wavelength of about 2.06 µm (see for example, FIG. 7). In one embodiment, the laser medium may be doped to have a concentration of Holmium of less or equal to about five atomic percent. FIG. 5 shows performance of the eye-safe laser 10, measured as a function of absorbed input energy at a wavelength of 885 nm at two different concentrations: in 5% Ho:BYF in FIG. 5a and in 10% Ho:BYF in FIG. 5b (10% used only for comparison purposes). The comparison of slope efficiencies of both lasers based on 5% and 10% Ho:BYF clearly demonstrates significant improvement in performance in low concentration crystal. The laser slope efficiency increases from about 3% in 10% Ho:BYF to about 11% in 5% Ho:BYF. In 10% Ho:BYF, the threshold for 1.67 µm laser action was reached at 4.4 mJ of pump pulse energy and maximal energy of about 8 mJ has been achieved with 270 mJ of absorbed pump energy at a wavelength of 885 nm. In 5% Ho:BYF, maximal energy of about 85 mJ has been achieved with 820 mJ of absorbed pump energy at a wavelength of 885 nm.

Predicted lower efficiency of a 1.67 µm laser constructed from a higher concentration laser crystal 32, is attributable to rapid build up of the population on the lower laser level. Such prediction is further supported by measurements of a temporal profile of laser pulses in both crystals as shown in FIG. 6. The temporal pulse profiles of the pump laser 22 at 890 nm are monitored with a fast silicon detector, while for the 1.67 µm laser pulses a fast InGaAs detector may be used. FIG. 6 demonstrates the temporal profiles of a pump pulse at 885 nm and the 1.67 nm laser pulse, both with pronounced laser spiking and relaxation oscillations. Spikes in the 1.67 µm pulse follow spikes in the 885 nm pump pulse. The laser cavity 30 having 5% Ho:BYF (FIG. 6a) is capable of sustaining laser action/population inversion for a significantly longer time than 10% Ho:BYF crystal (FIG. 6b), since at higher concentrations the population of the lower laser level grows rapidly, thereby causing self termination of laser action. Although the 1.67 µm pulse length increased twice due to reduction of concentration from 10% to 5% Ho in the BYF crystal, the latter still does not support lasing for the entire pump pulse length. The 70 µs long pulse duration of the Cr:LiSAF pumped laser 22 at 885 nm, therefore, is not utilized efficiently, although its duration matches well with the storage time of the upper laser level. This results in relatively low slope efficiencies. In order to create conditions for supporting laser action at the 1.67 µm single wavelength throughout the entire pump pulse duration, the concentration of holmium ions should be further reduced. The main issue with the low concentration crystals pumped in the relatively weak absorption band around 885 nm is the need for long crystals in end pump geometry or double or multiple passing of the pump beam. For example, in order to absorb 91% of the pump energy, 37 mm long crystals of 5% of Ho:BYF are needed, while the length of the 3% crystal would need to be increased to 62 mm to provide the same amount of absorption. The low absorption coefficient at the 885 nm pump wavelength in low concentration crystals generally makes side pumping less attractive as a possible configuration for this laser.

An alternative solution for increasing the slope efficiency of the 1.67 µm laser by utilizing the pump energy delivered in a long pulse, is to break the bottleneck due to the unfavorable lifetime ratio with an efficient depletion of the population of $^5I_7$, thereby creating conditions resembling a four-level laser. This approach allows the population inversion to be maintained within the storage time of the upper laser level and perhaps even beyond it. There are several possible ways of depleting the population on level $^5I_7$. For example, cascade lasing from $^5I_7$ to $^5I_8$ at 2.06 µm or pumping from level $^5I_7$ to some higher manifold (as described hereinbelow). Both methods may allow using not only low concentrations (<5%) but also higher concentrations (>10%) of Holmium doping in laser crystals. Thus, allowing length reduction of the laser crystal in an end pumped geometry and making side pumping of the 1.67 µm laser potentially feasible. The cascade process in Holmium doped fluorides and ZBLAN glass fibers can proceed down to produce sequential multi-wavelength stimulated emission as shown in FIG. 7. Laser oscillation between intermediate levels $^5I_5$ to $^5I_7$ will increase the rate of transition to the initial level of the next laser transition $^5I_7$ to $^5I_8$ and help overcome competing decay processes. In general, cascade action not only populates the initial level of the subsequent transition but also depletes the terminal level of the previous laser transition. This may increase saturation intensity in the 1.67 µm band, reduce threshold requirements and avoid self-termination of laser action on the 1.67 µm transition with the long terminal level lifetime. Reflectivity of cavity mirrors may be chosen to favor laser oscillation on both transitions 1.67 µm and 2.06 µm. In a cascade lasing process, crystal thermal loading is minimized, since the energy transfer to the upper laser level of the lower $^5I_7$ to $^5I_8$ transition is radiative.

A second method of breaking the bottleneck effect by depleting the population on terminal laser level $^5I_7$ includes pumping from the terminal laser level $^5I_7$ to some higher manifold. Spectroscopic evaluations of Ho:YLF and Ho:BYF indicate that 1.67 µm $^5I_5 \rightarrow ^5I7$ laser dynamics may lend itself to resonant two-step pumping with laser radiation at 750 nm due to a fortuitous coincidence of ground state absorption $^5I_8 \rightarrow ^5I_4$, and excited state absorption $^5I_7 \rightarrow ^5S_2$ (FIG. 8) combined with the efficient cross relaxation in high concentration crystals as shown, for example, in A. M. Tabirian, "New, efficient, room temperature mid-infrared laser at 3.9 µm in Ho:BaY$_2$F$_8$ and visible Pr:LiYF$_4$ laser for holography," Ph.D. Dissertation, Physics Department/School of Optics, UCF, (2000). A pump at 750 nm excites Ho ions from the ground state $^5I_8$ to the upper manifold $^5I_4$ with a relatively weak cross section, $\sigma_{5I8-5I4}=8 \cdot 10^{-23}$ cm$^2$ in Ho:BYF, and $\sigma_{5I8-5I4}=9.3 \cdot 10^{-23}$ cm$^2$ in Ho:YLF, whereas the excited state absorption cross section is $\sigma_{5I7-5S2}=4 \cdot 10^{-20}$ cm$^2$ for Ho:YLF. The excited state absorption cross section for Ho:BYF is expected to be the same order of magnitude. This is followed by multiphonon relaxation to lower levels, in particular the $^5I_7$ level, providing these levels with an initial population. Ions are then pumped from the $^5I_7$ level to the $^5S_2$ level by the same 750 nm pump, but the cross section of this transition is much larger: $\sigma_{5I7-5S2}=4 \cdot 10^{-20}$ cm$^2$. The absorption of Ho-doped YLF and BYF at 750 nm increases with pump intensity. This type of nonlinear absorption is known as "Reverse Saturable Absorption" (RSA). The measurements of nonlinear transmission demonstrating strong pumping from the $^5I_7$ level due to RSA may be performed with the sensitive single-beam technique, widely known as a Z-scan method as described, for example in M. Sheik-Bahae, A. A. Said, T.-H. Wei, D. J. Hagan and E. W. Van Stryland, "Sensitive measurement of optical nonlinearity using a single beam," IEEE J. Quant. Electron., Vol. 26 (4), (1990).

Using a single Gaussian laser beam in a tight focus geometry, the transmission of nonlinear medium (Ho:BYF crystal) through an open aperture in the near field was measured upon the translation of the crystal along the focused pump beam. The measurements were performed for two different samples of Ho:BYF (10% and 20%) for pump intensities ranging from about 9.5 kW/cm$^2$ to about 64 kW/cm$^2$. For 10% Ho:BYF, a 15% drop in transmission was observed compared to linear transmission, which is at a 99% level (FIG. 9a). For 20% Ho:BYF, a 25% drop in transmission was observed for pump polarization parallel to the x-axis of the crystal, and a 35% drop in transmission was observed for pump polarization parallel to the z-axis of crystal (FIG. 9b).

An alternative way of characterizing two step absorption combined with a cross relaxation process includes Z-scan measurements of fluorescence, which may serve as a direct way of monitoring the population on every single level of Ho$^{3+}$ as a function of pump intensity. By using appropriate detectors and bandpass filters, fluorescence may be selectively monitored at 540 nm, 915 nm, 1200 nm, 2060 nm, 490 nm and 640 nm, representing emission from $^5S_2$, $^5I_5$, $^5I_6$, $^5I_7$, $^5F_3$, and $^5F_5$ levels, respectively, to the ground state $^5I_8$. The 915 nm emission originating on upper level $^5I_5$ of the 1.67 µm laser transition in 10% and 20% Ho:YLF and Ho:BYF, demonstrates a nonlinear increase in fluorescence efficiency due to the combination of two step absorption and high cross relaxation rate while moving the samples to a focal plane of a focusing lens (FIGS. 10a and 10b). The 2060 nm emission originating on lower level $^5I_7$ of the 1.67 µm laser transition in both Ho:YLF and Ho:BYF first increases with pump intensity, but then drops at higher pump intensities since the 750 nm pumping depletes the $^5I_7$ level by exciting the Ho$^{3+}$ ions from $^5I_7$ to $^5S_2$ (FIGS. 11a and 11b).

An alternative two step absorption mechanism for efficient depletion of the $^5I_7$ level may be utilized by pumping Holmium doped fluoride crystals at 640 nm. Ground state absorption excites Ho ions from $^5I_8$ to $^5F_5$ with a cross section of $\sigma_{5I8-5F5}=7.5 \cdot 10^{-20}$ cm$^2$ in Ho:BYF, while efficient excited state absorption elevates ions from $^5I_7$ to $^5F_3$ energy levels. Excited state absorption at both pumping wavelengths 750 nm and 640 nm in Ho doped fluorozirconate ZBLAN fiber laser allows CW laser action on the self-terminating laser transition from $^5I_6$ to $^5I_7$ at a wavelength of 2.9 µm by removing the population from the $^5I_7$ manifold thereby effectively reducing its lifetime. The same pumping schemes at 750 nm or 640 nm may be utilized for achieving laser action on the 1.67 µm transition, for which the $^5I_7$ level serves as a lower laser level. Additionally, the efficiency of the eye-safe laser 10 may be enhanced by co-doping of laser material with ions Pr$^{3+}$ and Eu$^{3+}$, which could lead to a substantial reduction of the effective lifetime of the $^5I_7$ level due to nonradiative quenching.

FIG. 12 shows results of measurements of a transverse mode profile of a Ho:BYF 1.67 µm laser. The measurements may be obtained, for example, by an NIR Alpha camera from Indigo Systems, Inc. based on an InGaAs focal plane array with spectral response up to 1.7 µm. A low energy sample of the laser beam is reflected into the IR camera synchronized with the laser. With a properly aligned laser, TEM$_{00}$ mode operation may be achieved with the divergence close to that of diffraction limited beam propagation. Fluorides are less susceptible to thermal lensing than oxides. In many cases fluorides provide better beam quality at high powers. Additionally, due to the quasi-three level nature of the 1.67 µm laser, high beam quality may be achieved due to self-cleaning of the beam profile, in which high pump power density in the center of the beam leads to a very efficient conversion to 1.67 µm, while the power density in the periphery of the 890 nm beam might not be sufficient to overcome losses and to exceed a threshold for laser oscillation.

FIG. 13a demonstrates a wavelength spectrum of the eye-safe Holmium laser 10. Simultaneous lasing is observed at two different wavelengths: 1.662 µm and 1.688 µm. The laser polarization of each line is measured and found to be parallel to each other and to the b-axis of the BYF crystal. The energy states of Holmium in BYF are labeled as shown in FIG. 13b. Each manifold consists of a number of energy sublevels, which are split in energy by the crystal field of the host. The populations of these splittings are related to that of the entire manifold by a Boltzman distribution. Laser transitions occur between specific field splittings of the two Holmium manifolds. The most likely transitions representing two lines of the Holmium laser, 1.662 µm and 1.688 µm, are shown in FIG. 13b.

Linear down converters are of practical interest when pumped by efficient, well-developed sources. Performance of the eye-safe laser 10 in an end pumped geometry was evaluated with a tunable flashlamp pumped Cr:LiSAF laser at about 885 nm used as a pump source. This pump wavelength is attractive because it also matches the output available from high power laser diode arrays. In particular, due to a large demand for semiconductor lasers at 885 nm for an alternative pumping scheme of Nd:YAG crystals, these sources have been the subject of intense research and development efforts during recent years. A diode pumped configuration may achieve simplicity and increase overall wall plug efficiency of the eye-safe laser 10. Due to relatively wide absorption bands around 885 nm in Ho:BYF and Ho:YLF, performance of a 3.9 μm laser is expected to be less susceptible to the diode pump wavelength/temperature detuning than in the diode-pumped Nd:YAG systems. FIG. 14 demonstrates the results of numerical modeling of pump absorption efficiency, convolution of the spectral output of a laser diode array with FWHM about 3 nm, and an absorption spectra of both materials: Ho:BYF and Ho:YLF. Tolerances for pump wavelength detuning due to temperature variations of the laser diode arrays are rather wide. The pump efficiency is flat within a temperature interval of 20° C. for pumping along the b-axis in Ho:BYF and within ~14° C. for pumping along the c-axis in Ho:YLF in the 890 nm absorption band.

FIG. 15 is a flowchart illustrating a method for generating an eye-safe laser beam at room temperature according to an exemplary embodiment of the present invention. The method includes producing pulses having a duration that is at least as long as a storage time of the $^5I_5$ level of a laser medium at operation 100, and pumping the laser medium with the pulses at operation 110. At operation 120, the laser medium generates an output upon a transition from the $^5I_5$ level to the $^5I_7$ level.

Numerous application areas for the eye-safe Holmium laser 10 described hereinabove include illumination for imaging systems, 3-D imaging laser radars, range finding, target location, etc.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A lasing apparatus comprising:
    a laser medium selected from the group comprising a Holmium-doped fluoride crystal and a fluorozirconate ZBLAN glass fiber; and
    a pump source for generating pulses that resonantly pump the laser medium with signals having a wavelength of about 640 nm, about 750 nm or about 885 nm such that the laser medium produces an output upon a transition from the $^5I_5$ level to the $^5I_7$ level, wherein the pump source produces pulses having a duration that substantially matches a storage time of the $^5I_5$ level of the laser medium.

2. The lasing apparatus of claim 1, wherein the laser medium further comprises a co-dopant comprised of at least one of Praseodymium ($Pr^{3+}$) and Europium ($Eu^{3+}$).

3. The lasing apparatus of claim 1, wherein a concentration of Holmium is no greater than about five atomic percent.

4. The lasing apparatus of claim 3, wherein the Holmium-doped fluoride crystal is Ho:BYF.

5. The lasing apparatus of claim 1, wherein the lasing medium comprises a crystal slab having a length of between about 35 mm and about 37 mm.

6. The lasing apparatus of claim 1, wherein the laser medium produces an output having a wavelength of about 1.67 μm.

7. A method for generating an eye-safe laser beam at room temperature, the method comprising:
    producing pulses having a duration that substantially matches a storage time of the $^5I_5$ level of a laser medium; and
    pumping the laser medium with the pulses, wherein pumping the laser medium comprises pumping the laser medium with a pulsed signal in which the pulses have a wavelength of about 640 nm, about 750 nm, or about 885 nm; and
    generating an output upon a transition from the $^5I_5$ level to the $^5I_7$ level.

8. The method of claim 7, further comprising generating an output beam having a wavelength of about 2.06 μm in cascade with the output beam having the wavelength of about 1.67 μm.

9. The method of claim 7, further comprising an initial step of doping the laser medium with a concentration of Holmium is no greater than about five atomic percent.

10. The lasing apparatus of claim 1, wherein a concentration of Holmium is no greater than about two atomic percent.

11. The lasing apparatus of claim 10, wherein the pump source is tuned to produce a pulse signal at a wavelength of about 885 nm.

12. The lasing apparatus of claim 11, wherein the pump source comprises at least one laser selected from the group comprising:
    a Cr:LiSAF laser;
    a diode laser or diode laser array; and
    a Ti:sapphire laser.

13. The lasing apparatus of claim 1, wherein if a concentration of Holmiun is greater than about five atomic percent, then the pump source is tuned to produce a pulse signal at a wavelength of about 640 nm or 750 nm.

14. The lasing apparatus of claim 13, wherein at least one pump source comprises at least one laser selected from the group comprising:
    a Cr:LiCAF laser;
    an Alexandrite laser;
    a diode laser or diode laser array;
    a dye laser; and
    a Ti:sapphire laser.

15. The method of claim 7, further comprising an initial step of doping the laser medium with a concentration of Holmium is no greater than about two atomic percent.

16. The method of claim 15, wherein pumping the laser medium comprises tuning a pump source to produce a pulse signal at a wavelength of about 885 nm.

17. The method of claim 7, wherein if a concentration of Holmium is greater than about five atomic percent, then pumping the laser medium comprises tuning a pump source to produce a pulse signal at a wavelength of about 640 nm or 750 nm.

* * * * *

UNITED STATES PATENT AND TRADEMARK OFFICE
CERTIFICATE OF CORRECTION

| | | |
|---|---|---|
| PATENT NO. | : 7,352,790 B2 | Page 1 of 1 |
| APPLICATION NO. | : 11/337757 | |
| DATED | : April 1, 2008 | |
| INVENTOR(S) | : Tabirian et al. | |

It is certified that error appears in the above-identified patent and that said Letters Patent is hereby corrected as shown below:

<u>Column 16,</u>
Line 40, "Holmiun" should read --Holmium--.

Signed and Sealed this

First Day of July, 2008

JON W. DUDAS
*Director of the United States Patent and Trademark Office*